United States Patent
O'Connor et al.

(10) Patent No.: US 9,264,300 B2
(45) Date of Patent: Feb. 16, 2016

(54) HYBRID DISTRIBUTED LINEAR PROTECTION

(71) Applicant: Fujitsu Limited, Kanagawa (JP)

(72) Inventors: Donald O'Connor, McKinney, TX (US); Virgil Vladescu, Hillsdale, NJ (US)

(73) Assignee: Fujitsu Limited, Kawasaki-shi (JP)

( * ) Notice: Subject to any disclaimer, the term of this patent is extended or adjusted under 35 U.S.C. 154(b) by 206 days.

(21) Appl. No.: 13/848,478

(22) Filed: Mar. 21, 2013

(65) Prior Publication Data

US 2014/0286154 A1    Sep. 25, 2014

(51) Int. Cl.
    *H04L 12/24* (2006.01)
    *H04L 12/703* (2013.01)
    *H04L 12/713* (2013.01)
    *H04L 12/715* (2013.01)

(52) U.S. Cl.
    CPC ............ *H04L 41/0659* (2013.01); *H04L 45/04* (2013.01); *H04L 45/28* (2013.01); *H04L 45/586* (2013.01)

(58) Field of Classification Search
    None
    See application file for complete search history.

(56) References Cited

U.S. PATENT DOCUMENTS

| | | | |
|---|---|---|---|
| 6,332,198 B1 * | 12/2001 | Simons et al. | 714/6.31 |
| 6,848,062 B1 * | 1/2005 | Desai et al. | 714/4.1 |
| 8,675,479 B2 | 3/2014 | Cirkovic et al. | 370/228 |
| 2002/0080445 A1 * | 6/2002 | Falkenstein et al. | 359/127 |
| 2005/0195807 A1 * | 9/2005 | Rao et al. | 370/386 |
| 2007/0086364 A1 * | 4/2007 | Ellis et al. | 370/258 |
| 2010/0287405 A1 | 11/2010 | Soon | 714/4 |
| 2012/0120793 A1 | 5/2012 | Corti | 370/228 |
| 2012/0294140 A1 * | 11/2012 | Cheung et al. | 370/216 |
| 2013/0071117 A1 | 3/2013 | Pan et al. | 398/45 |
| 2014/0233373 A1 | 8/2014 | O'Connor | 370/228 |

OTHER PUBLICATIONS

RFC 1136 "Administrative Domains and Routing Domains a Model for Routing in the Internet" Dec. 1989.*
C1580, "G.873.1 Amendment", ITU-T SG15 Study Period 2009-2012, 16 pages, Oct. 2012.
Martini, Luca, et al.; "Inter-Chassis Communication Protocol for L2VPN PE Redundancy (ICCP);" draft-ietf-pwe3-iccp-09.txt; http://tools.ietf.org/html/draft-ietf-pwe3-iccp-09; 80 pages, Jul. 30, 2012.
802.1AX™-2008—IEEE Standard for Local and metropolitan area networks—Link Aggregation; 163 pages, Nov. 3, 2008.

(Continued)

*Primary Examiner* — Kerri Rose
(74) *Attorney, Agent, or Firm* — Baker Botts L.L.P.

(57) ABSTRACT

A method for linear protection for a network element communicatively coupled to another network element included in a node portal located at the edge of an administrative network domain includes exchanging linear automatic protection switching ("APS") messages with clients in the administrative network domain over one or more path pairs. The path pairs include a working path communicatively coupling a client and the network element and a protect path communicatively coupling a client and the other network element. The method also includes translating the linear APS messages into a shared mesh protection message and exchanging the shared mesh protection message between the network element and the other network element over an intraportal link. The shared mesh protection messages include information concerning a plurality of working paths.

35 Claims, 13 Drawing Sheets

(56) References Cited

OTHER PUBLICATIONS

G.873.1, "Optical Transport Network (OTN): Linear protection", Jul. 2011, 30 pages.
Pseudowire Redundancy, "draft-ietf-pwe3-redundancy-05.txt", Sep. 2011.
Pseudowire Preferential forwarding Status Bit, "draft-ietf-pwe3-redundancy-bit-03.txt", May 2010.
Fujitsu, "Flashwave® 9500 Packet Optical Networking Platform", 10 pages, 2014.
IEEE P802.1AX, Local and metropolitan area networks—Link Aggregation Amendment 1: Protocol Addressing, IEEE Computer Society, 60 pages, Mar. 29, 2012.
Non-final Office Action issued in U.S. Appl. No. 13/768,857; 38 pages, Aug. 15, 2014.
Final Office Action issued in U.S. Appl. No. 13/768,857; 41 pages, Jan. 29, 2015.

* cited by examiner

HYBRID DISTRIBUTED LINEAR PROTECTION

TECHNICAL FIELD OF THE INVENTION

The present invention relates generally to networked communications and, more particularly, to hybrid distributed linear protection.

BACKGROUND

Ethernet, Optical Transport Network (OTN), and Multi-protocol Label Switching Transport Profile (MPLS-TP) automatic protection switching under linear protection standards—such as the G.8031 Ethernet Linear Protection, G.873.1 OTN Linear Protection, or MPLS-TP Linear Protection G.8131.1 and G.8131.2 standards—may use protected paths, such as a working path and a protect path, to communicate between virtual local area networks. The paths are monitored, and if one of the paths is detected as faulty, the backup path may take over and traffic continues to flow. The standards have heretofore dictated the specific protocol for switching traffic between the paths in a variety of circumstances.

SUMMARY

In some embodiments, a method for network communications may include, at a node portal located at the edge of an administrative network domain, providing multi-node distributed protection for clients in the administrative domain. The multi-node distributed protection may include providing dedicated 1:1 protection switching to each of the clients in the administrative network domain, and performing 1:N protection switching for each of the clients on an intraportal link within the node portal. The node portal may include a network element communicatively coupled to another network element through the intraportal link. Providing dedicated 1:1 protection switching to each of the clients in the administrative network domain includes exchanging linear automatic protection switching ("APS") messages with the clients in the administrative network domain over a path pair to each client. Each path pair may include a working path communicatively coupling a respective client and the network element, and a network protect path communicatively coupling the respective client and the other network element. Performing 1:N protection switching for each of the clients on the intraportal link may include translating the linear APS messages received on the network protect path into a shared mesh protection message, and exchanging the shared mesh protection message between the network element and the other network element over the intraportal link. The shared mesh protection message may be configured to activate a protection path segment on the intraportal link. The protection path segment may be configured to protect a plurality of working paths.

In other embodiments, an article of manufacture includes a computer readable medium and computer-executable instructions carried on the computer readable medium. The instructions are readable by a processor. The instructions, when read and executed, cause the processor, at a node portal located at the edge of an administrative network domain, provide multi-node distributed protection for clients in the administrative domain. The multi-node distributed protection may include providing dedicated 1:1 protection switching to each of the clients in the administrative network domain, and performing 1:N protection switching for each of the clients on an intraportal link within the node portal. The node portal may include a network element communicatively coupled to another network element through the intraportal link. Providing dedicated 1:1 protection switching to each of the clients in the administrative network domain includes exchanging linear APS messages with the clients in the administrative network domain over a path pair to each client. Each path pair may include a working path communicatively coupling a respective client and the network element, and a network protect path communicatively coupling the respective client and the other network element. Performing 1:N protection switching for each of the clients on the intraportal link may include translating the linear APS messages received on the network protect path into a shared mesh protection message, and exchanging the shared mesh protection message between the network element and the other network element over the intraportal link. The shared mesh protection message may be configured to activate a protection path segment on the intraportal link. The protection path segment may be configured to protect a plurality of working paths.

In yet other embodiments, a system for network communications includes a node portal located at the edge of an administrative network domain and an intraportal link included within the node portal. The node portal is configured to provide multi-node distributed protection for clients in the administrative domain. The multi-node distributed protection may include providing dedicated 1:1 protection switching to each of the clients in the administrative network domain, and performing 1:N protection switching for each of the clients on an intraportal link within the node portal. The node portal may include a network element communicatively coupled to another network element through the intraportal link. Providing dedicated 1:1 protection switching to each of the clients in the administrative network domain includes exchanging linear APS messages with the clients in the administrative network domain over a path pair to each client. Each path pair may include a working path communicatively coupling a respective client and the network element, and a network protect path communicatively coupling the respective client and the other network element. Performing 1:N protection switching for each of the clients on the intraportal link may include translating the linear APS messages received on the network protect path into a shared mesh protection message, and exchanging the shared mesh protection message between the network element and the other network element over the intraportal link. The shared mesh protection message may be configured to activate a protection path segment on the intraportal link. The protection path segment may be configured to protect a plurality of working paths.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
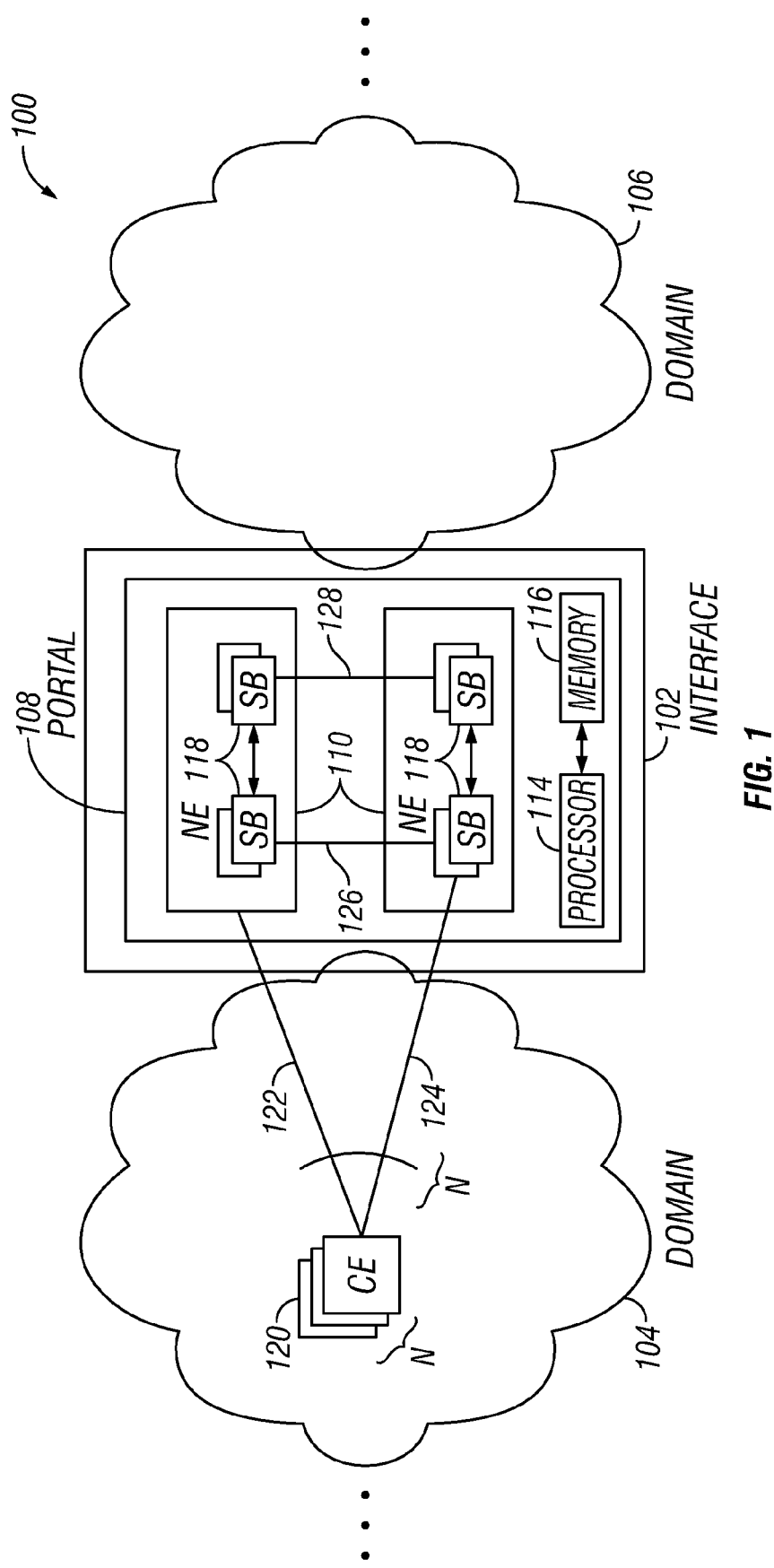
FIG. 1 is an example embodiment of a system for providing hybrid distributed linear protection.

FIG. 1 illustrates an example embodiment of a system 100 for providing hybrid distributed linear protection. System 100, as illustrated in FIG. 1, may illustrate an embodiment of a general scheme applicable to a variety of network models and protocols. System 100 may include one or more interfaces 102, each interface communicatively coupled between two entities such as domains 104, 106. Any suitable number and kind of interfaces 102 may be included as described herein. In one embodiment, interface 102 may itself be considered a domain. Each of domains 104, 106 may also be communicatively coupled to additional portions of a network, such that end-to-end network connectivity is provided between two network entities in communication with each other.

The network space in which system 100 is included may thus be segmented. By segmenting the network space into, for example, domains 104, 106 and interface 102, protection of portions of the network communications path may be handled internally to a given domain such that errors within such a domain may not require notification, handling, or other operation for elements of other domains. Thus, the segmented protection may result in isolation between domains. The isolation may allow different domains owned or controlled by different entities to be administrated independently. Furthermore, the isolation may result in a protection event that does not impact other domains. Also, protection events are less likely to be encountered because each protected path is shorter, meaning that the number of network elements notified about the protection event is fewer.

The network space may be segmented according to linear protection, such that interim point-to-point connections with the overall end-to-end connection may be monitored. The linear protection may include, for example, linear packet protection or circuit switched linear protection.

Domains 104, 106 and interface 102 may use a suitable linear protection protocol such as those for Ethernet or Optical Transport Network (OTN) networks, including G.873.1 OTN Linear Protection, G.8031 Ethernet Linear Protection, or Multiprotocol Label Switching Transport Profile (MPLS-TP) Linear Protection G.8131.1 or G.8131.2.

System 100 may be configured to provide link and node failure detection such that various elements of system 100 may instantiate protection connections to maintain communication links. In one embodiment, system 100 may be configured to provide node failure detection when using a hybrid between ring and mesh distributed linear protection. In another embodiment, system 100 may be configured to provide link failure detection when using a hybrid between ring and mesh distributed linear protection.

Interface 102 may be implemented in any suitable manner according to the descriptions herein. Although interface 102 is illustrated as a single entity, interface 102 may be implemented in a logical fashion such that interface 102 is actually the sum of separate and distinct components. Interface 102 may be implemented as, for example, an External Network-Network Interface (E-NNI), User Network Interface (UNI), or an Internal Network-Network Interface (I-NNI).

Each interface 102 may include one or more portals 108. Although portal 108 is illustrated as a single entity, portal 108 may be implemented in a logical fashion such that portal 102 is actually the sum of separate and distinct components. Portal 108 may be configured to provide ingress or egress into an administrative network domain such that an entity managing the network domain may control the transmission of information in or out of the network domain through control or management of the respective portal. Thus, portal 108 may be located at the logical edge of an administrative network domain.

Portal 108 may be implemented as a two-node portal. One such node may provide protect path ingress and egress and another such node may provide working path ingress and egress. Each node may be implemented by a network element (NE) 110.

NE 110 may be implemented in any suitable manner. Each NE 110 may include separate and distinct physical components from another such NE. Furthermore, each NE 110 may represent a logical or virtual NE in which actual resources are shared but each NE 110 can be operated in independent fashion. Thus, each NE 110 may be implemented as a network switch, router, server, line card, or other suitable module, electronic or optical device. Portal 108 may include a processor 114 communicatively coupled to a memory 116. Each NE 110 may include such a memory and processor. NE 110 may be configured to monitor respective protect paths for control and status messages, such as automatic protection switching ("APS") messages.

Processor 114 may comprise, for example, a microprocessor, microcontroller, digital signal processor (DSP), application specific integrated circuit (ASIC), or any other digital or analog circuitry configured to interpret and/or execute program instructions and/or process data. Processor 114 may interpret and/or execute program instructions and/or process data stored in memory 116. Memory 116 may comprise any system, device, or apparatus configured to hold and/or house one or more memory modules. Each memory module may include any system, device or apparatus configured to retain program instructions and/or data for a period of time (e.g., computer-readable media). The configuration and operation of an NE 110 or portal 108 may be partially or fully implemented by instructions on memory 116 that, when loaded and executed by processor 114, cause the operation described herein.

Each NE 110 may include a set of selector and bridge (SB) devices 118. Each SB 118 may include the ability to selectively route signals between two of its inputs. Each SB 118 may be implemented in any suitable manner, such as by a virtual switch controlled by the respective NE 110 in which SB 118, or by a function, module, or other mechanism for routing signals. In one embodiment, each NE 110 may include a set of SB devices 118 for each side of portal 108. In another embodiment, each set of SB devices 118 may include an SB device for each working path/protect path combination to which portal 108 is communicatively coupled in domains 104, 106. For example, domain 104 may include N multiple clients 120 communicatively coupled to portal 108, wherein each client 120 is communicatively coupled with its own pair of paths 122, 124, one of which may be designated as a protect path and one which may designated as a working path. Accordingly, each NE 110 may include a set of N SBs 118 for each side of portal 108, wherein each of SBs 118 on each side of portal 108 correspond to one of the pairs of paths 122, 124 used by one of clients 120 to connect to portal 108.

By including a pair of paths 122, 124 and a set of SBs 110 for each of the N clients 120 communicatively coupled to portal 108, system 100 may thus implement aspects of a ring topology, wherein each end-to-end connection is provided a dedicated path between elements of domain 104 and portal 108, a dedicated path between portal 108 and domain 104, and a dedicated path within an individual NE 110.

SBs 118 may be configured to route signals amongst portal 108 and between NEs 110 within interface 102. To communicate between NEs 110 within a given portal 108, portal 108 may include a pair of intraportal links (IPL) 126, 128, communicatively coupling NEs 110. Each of IPLs 126, 128 may include a physical link and a logical link. IPLs 126, 128 may be configured to carry data plane traffic, automatic protection switching (APS) messages, and other monitoring messages that a given one of NEs 110 may use to monitor the status of another one of NEs 110 within the same portal. Furthermore, SBs may be configured to route traffic in or out of portal 108 as communicated with from various entities such as clients 120.

Although system 100 may include a pair of paths 122, 124 and a set of SBs 110 for each of the N clients 120 communicatively coupled to portal 108 resulting in N dedicated paths, system 100 may be configured to traffic all such paths over a single IPL such as IPL 126 or IPL 128, if necessary. During such trafficking, IPL 126 or IPL 128 may be considered as a single path segment. System 100 may thus implement aspects of a mesh topology.

Clients 120 may include any suitable entity, such as a server, computer, router, or switch. Clients 120 may include an entity within the specified network or domain. Clients 120 may reside in any suitable portion of the specified domain or network, including at a service edge of such networks.

Networks in association with system 100 may each comprise any suitable network—for example, a local-area-network, wide-area-network, a network of metro Ethernet switches, virtual-local-area-network, optical networks, Ethernet networks, an intranet, or a portion of the Internet. The networks may include elements configured for User Network Interface (UNI), E-NNI, or both. Furthermore, the networks may include elements be configured to utilize singled-homed or multiple-homed UNI. In such cases wherein multiple-homed UNI, such as double-homed UNI, is used, a customer node may be configured to connect to system 100 to provide UNI edge nodes.

System 100 may be applied to any suitable domain protection model. For example, system 100 may be implemented in a network to a Network to External Network-Network Interface (N2E) Reference Model for Segmented Multi-domain Protection; a Network to User Network Interface (N2U) Reference Model for Segmented Multi-domain Protection; or a Network to Network (N2N) Reference Model for Segmented Multi-domain Protection.

Figure 2:
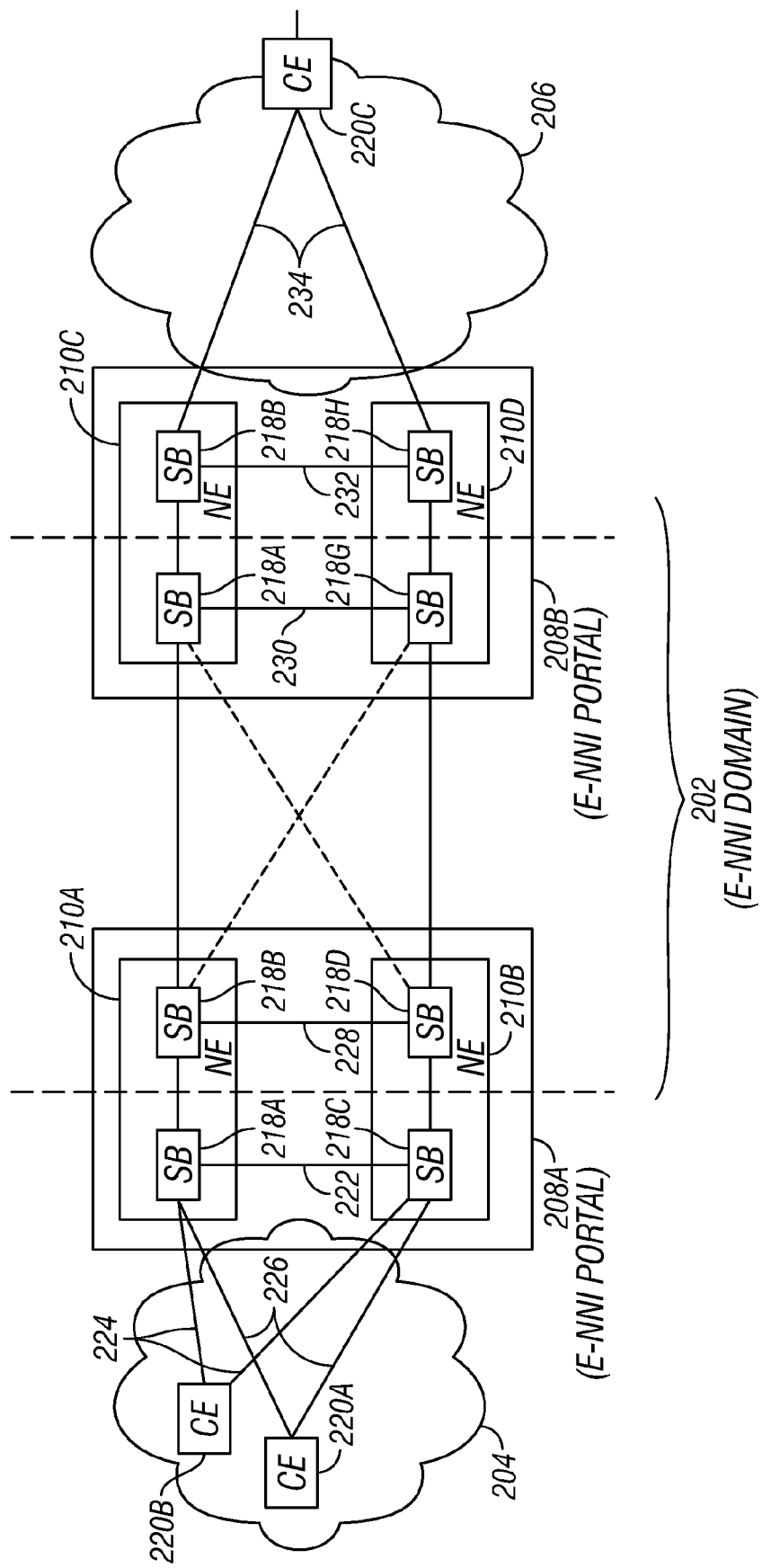
FIG. 2 illustrates an example embodiment of a system implemented in a Network to External Network-Network Interface Reference Model.

FIG. 2 illustrates an example embodiment of system 100 implemented in an N2E reference model.

Portals 208A, 208B may be implemented as E-NNI portals. Portal 208A may include NEs 210A, 210B communicatively coupled by IPLs 222, 228. NE 210A may include SBs 218A, 218B. NE 210B may include SBs 218C, 218D. Portal 208B may include NEs 210C, 210D communicatively coupled by IPLs 230, 232. NE 210C may include SBs 218E, 218F. NE 210D may include SBs 218G, 218H.

Domain 204 may include an OTN or Ethernet protection domain, including clients 220A, 220B. Furthermore, domain 204 may encapsulate a portion of portal 208A, including SBs 218A, 218C and IPL 222.

Domain 202 may include an OTN or Ethernet E-NNI protection domain. Furthermore, domain 202 may include portions of portal 208A such as SBs 218B, 218D and IPL 228. In addition, domain 202 may include portions of portal 208B such as SBs 218E, 218G and IPL 230.

Domain 206 may include an OTN or Ethernet protection domain, including client 220C. Furthermore, domain 206 may encapsulate a portion of portal 208B, including SBs 218F, 218H and IPL 232

Client 220A may be communicatively coupled to portal 208A via a path pair 226, one of which may be designated as a protect path and one of which may be designated as an active path. Client 220B may be communicatively coupled to portal 208A via a path pair 224, one of which may be designated as a protect path and one of which may be designated as an active path. Client 220C may be communicatively coupled to portal 208B via a path pair 234, one of which may be designated as a protect path and one of which may be designated as an active path.

In some embodiments, an active path or a protect path may be understood as a complete end-to-end path from one client across multiple administrative network domains to another client. In other embodiments, the term of an active "path" or a protect "path" may be understood as a segment of such an end-to-end path. Accordingly, references to, for example, detecting errors on paths, switching paths, connecting paths, routing paths, or contents of path pairs may refer to segments of such paths, as discussed herein and illustrated in the Figures.

Figure 3:
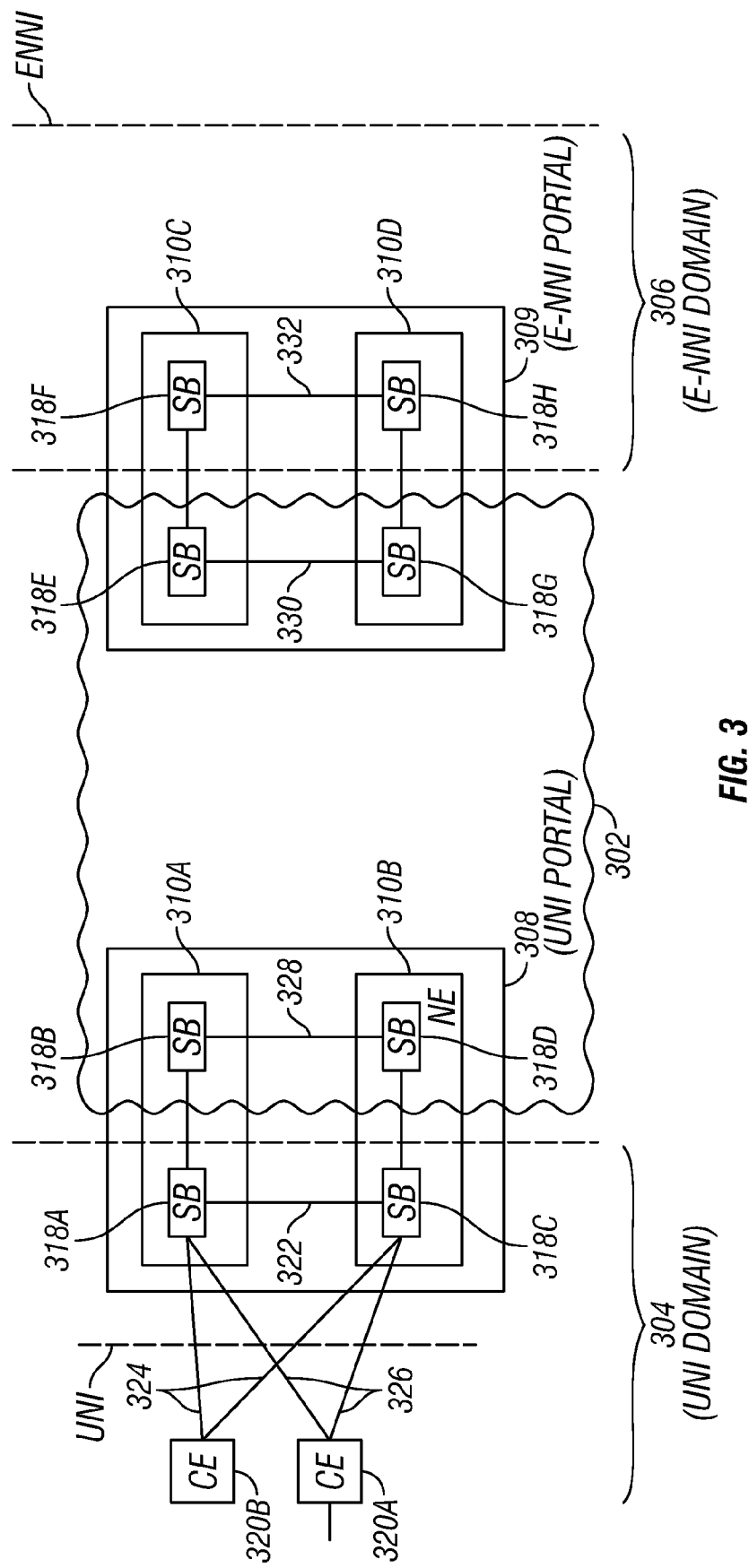
FIG. 3 illustrates an example embodiment of a system implemented in a Network to User Network Interface Reference Model.

FIG. 3 illustrates an example embodiment of system 100 implemented in an N2U reference model.

Portal 308 may be implemented as a UNI portal. Portal 309 may be implemented as an E-NNI portal. Portal 308 may include NEs 310A, 310B communicatively coupled by IPLs 328, 322. NE 310A may include SBs 318A, 318B. NE 310B may include SBs 318C, 318D. Portal 309 may include NEs 310C, 310D communicatively coupled by IPLs 330, 332. NE 310C may include SBs 318E, 318F. NE 310D may include SBs 318G, 318H.

Domain 304 may include an Ethernet UNI protection domain, including clients 320A, 320B. Furthermore, domain 304 may encapsulate a portion of portal 308, including SBs 318A, 318C and IPL 322.

Domain 302 may include an OTN or Ethernet Network protection domain. Furthermore, domain 302 may include portions of portal 308 such as SBs 318B, 318D and IPL 328. In addition, domain 302 may include portions of portal 309 such as SBs 318E, 318G and IPL 330.

Domain 306 may include an E-NNI domain. Furthermore, domain 306 may encapsulate a portion of portal 309, including SBs 318F, 318H and IPL 332.

Client 320A may be communicatively coupled to portal 308 via a path pair 326, one of which may be designated as a protect path and one of which may be designated as an active path. Client 320B may be communicatively coupled to portal 308 via a path pair 324, one of which may be designated as a protect path and one of which may be designated as an active path.

Figure 4:
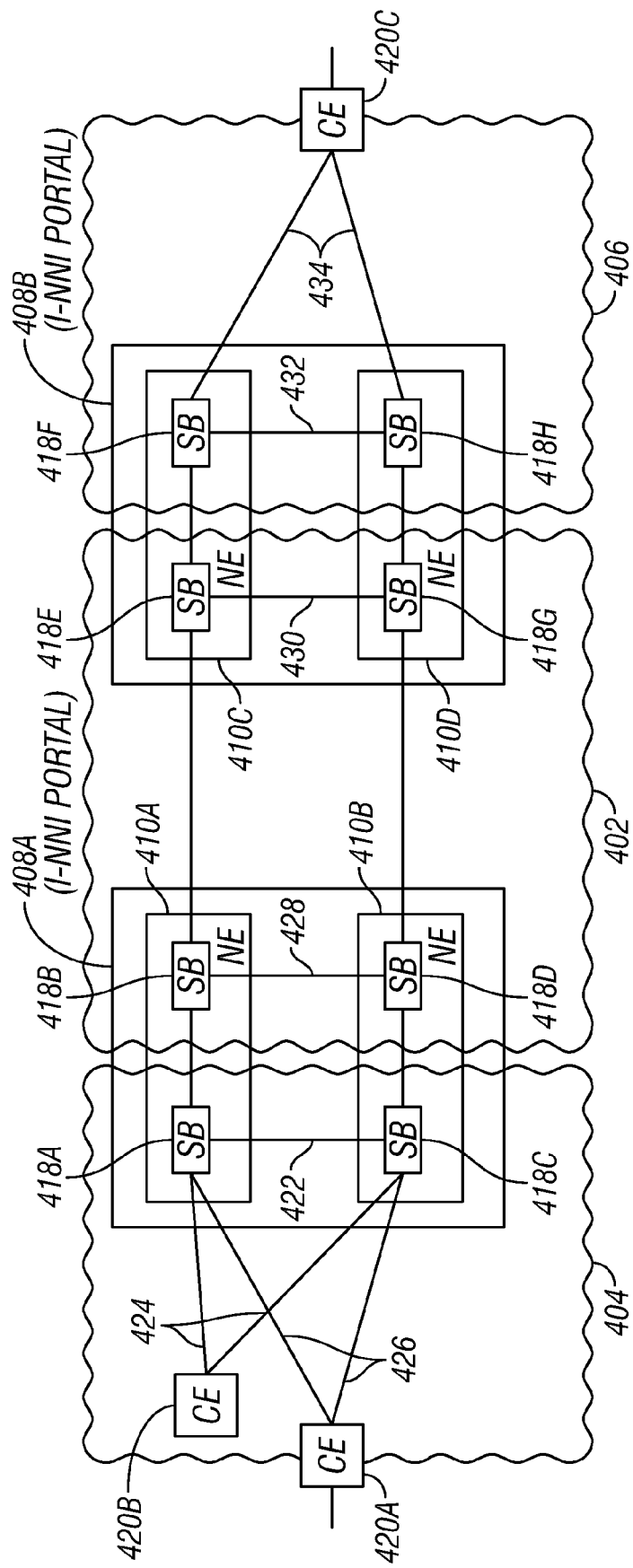
FIG. 4 illustrates an example embodiment of system implemented a Network to Network Reference Model.

FIG. 4 illustrates an example embodiment of system 100 implemented in an N2N reference model.

Portals 408A, 408B may be implemented as I-NNI portals. Portal 408A may include NEs 410A, 410B communicatively coupled by IPLs 422, 428. NE 410A may include SBs 418A, 418B. NE 410B may include SBs 418C, 418D. Portal 408B may include NEs 410C, 410D communicatively coupled by IPLs 430, 432. NE 410C may include SBs 418E, 418F. NE 410D may include SBs 418G, 418H.

Domain 404 may include an OTN or Ethernet protection domain, including clients 420A, 420B. Furthermore, domain 404 may encapsulate a portion of portal 408A, including SBs 418A, 418C and IPL 422.

Domain 402 may include an OTN or Ethernet E-NNI protection domain. Furthermore, domain 402 may include portions of portal 408A such as SBs 418B, 418D and IPL 428. In addition, domain 402 may include portions of portal 408B such as SBs 418E, 418G and IPL 430.

Domain 406 may include an OTN or Ethernet protection domain, including client 420C. Furthermore, domain 406 may encapsulate a portion of portal 408B, including SBs 418F, 418H and IPL 432

Client 420A may be communicatively coupled to portal 408A via a path pair 426, one of which may be designated as a protect path and one of which may be designated as an active path. Client 420B may be communicatively coupled to portal 408A via a path pair 424, one of which may be designated as a protect path and one of which may be designated as an active path. Client 420C may be communicatively coupled to portal 408B via a path pair 434, one of which may be designated as a protect path and one of which may be designated as an active path.

Figure 5A:
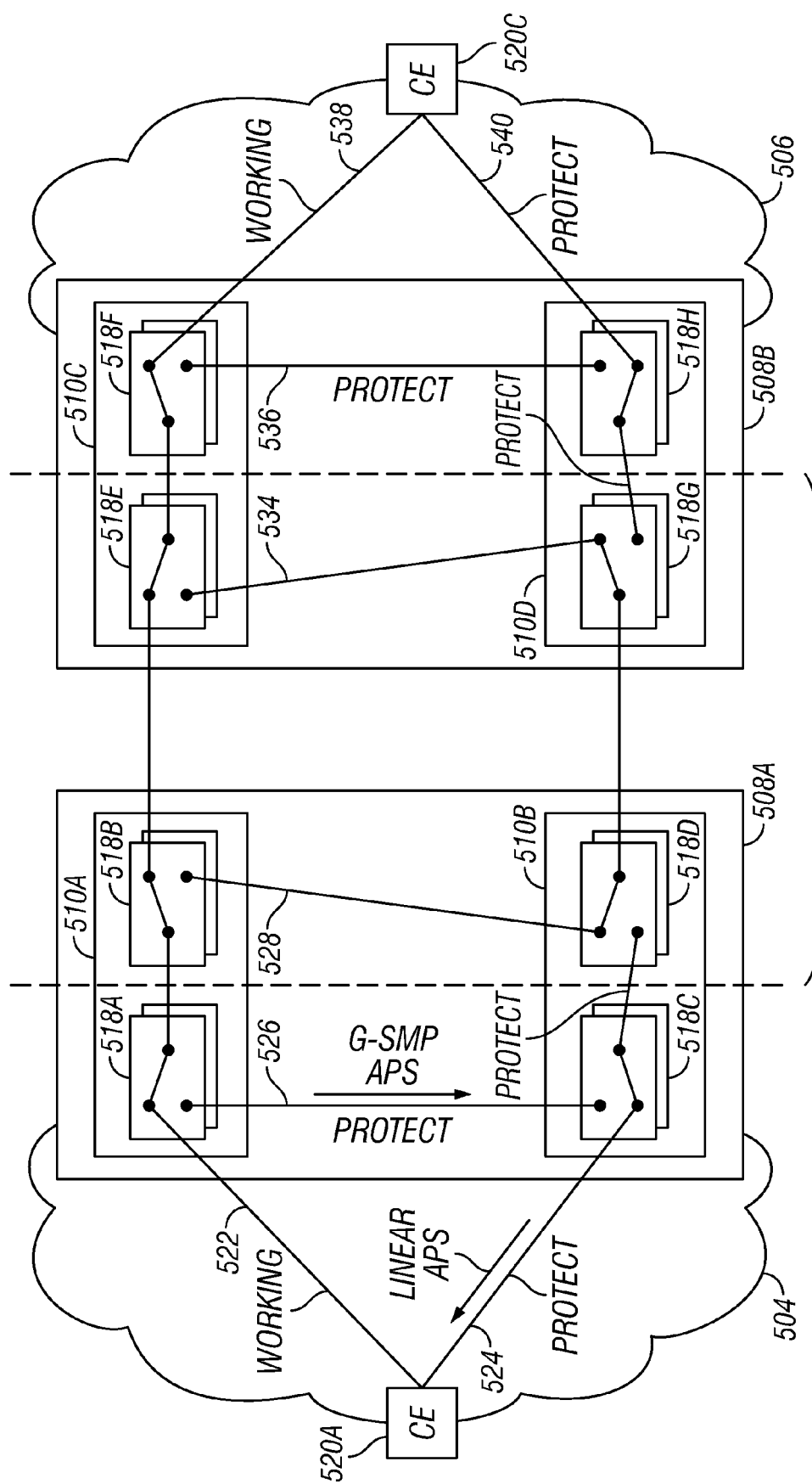
FIGS. 5A and 5B are more detailed illustrations of an example embodiment of a system for providing hybrid distributed linear protection.
Figure 5B:
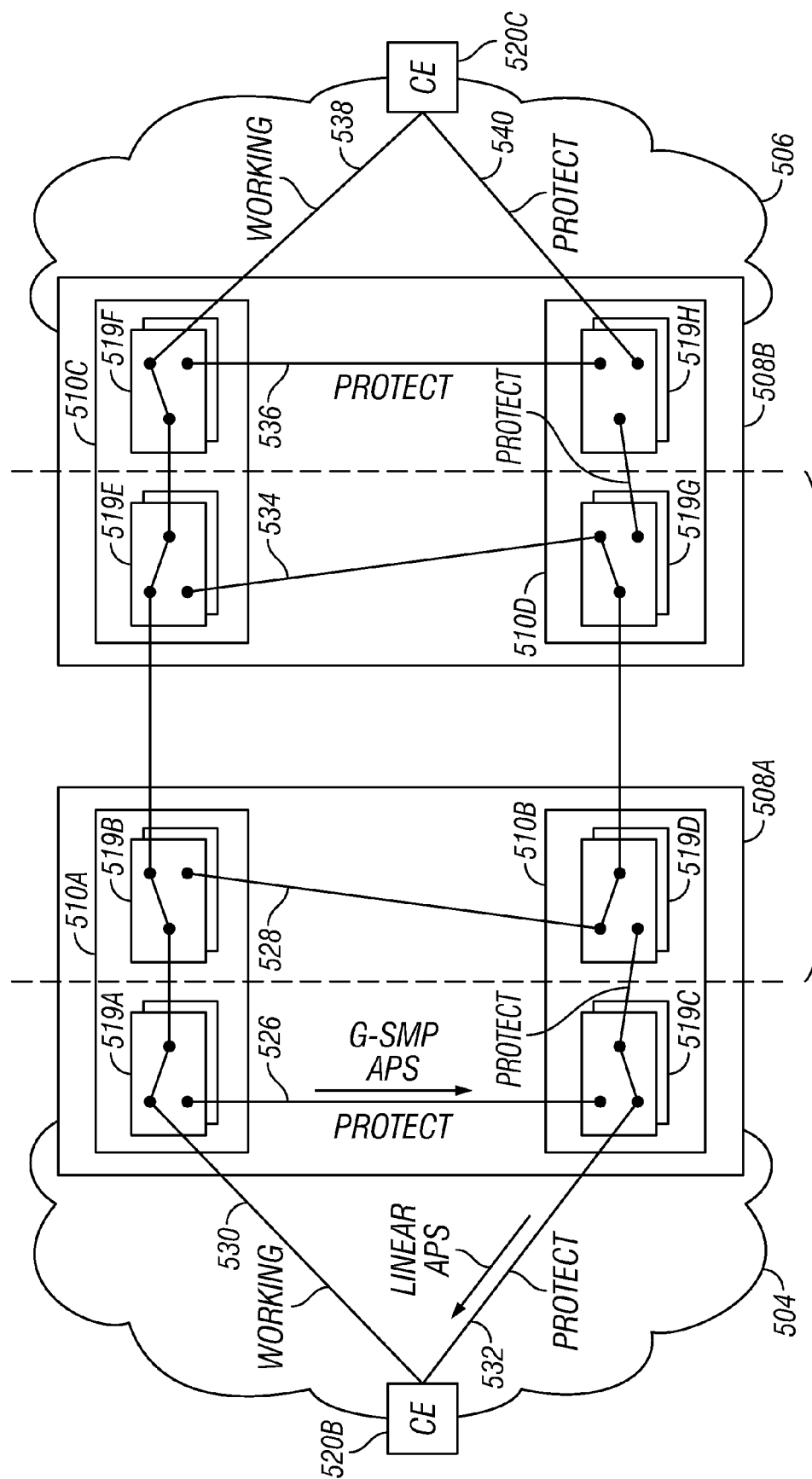

FIGS. 5A and 5B are more detailed illustrations of an example embodiment of system 100. Reference may be made to the configuration of portal 508A, while portal 508B may be configured in similar fashion. System 100, as illustrated in FIGS. 5A and 5B, should be understood as applicable to any models such as those described in conjunction with FIGS. 2-4. FIG. 5A may provide more detailed illustrations of the configuration and operation of system 100 to provide switching for a client 520A. Furthermore, FIG. 5B may provide more detailed illustrations of the configuration and operation of system 100 to provide switching for a client 520B. The configuration and operation of system 100 to provide switching for a client 520A may exist in parallel with the configuration and operation of system 100 to provide switching for a client 520B.

A domain 504 may be communicatively coupled to an interface 502, which in turn may also comprise a domain. Interface 502 may be communicatively coupled to domain 506.

Interface 502 may include a portal 508A. Furthermore, interface 502 may include a portal 508B communicatively coupled to portal 508A.

Portal 508A may include two nodes, such as NE 510A communicatively coupled to NE 510B through IPLs 526, 528. NE 510A may include SBs 518A, 518B, 519A, 519B and NE 510B may include SBs 518C, 518D, 519C, 519D.

Portal 508B may include two nodes, such as NE 510C communicatively coupled to NE 510D through IPLs 534, 536. NE 510C may include SBs 518E, 518F, 519E, 519F and NE 510D may include SBs 518G, 518H, 519G, 519H. Domain 506 may include a client 520C communicatively coupled to NE 510C and to NE 510D through a path 538 and a path 540. In the example of FIGS. 5A-5B, path 538 may be designated as a working path and path 540 may be designated as a protect path.

FIG. 5A may illustrate that domain 504 may include a client 520A communicatively coupled to NE 510A through path 522 and communicatively coupled to NE 510B through path 524. Furthermore, FIG. 5B may illustrate that domain 504 may include a client 520B communicatively coupled to NE 510A through path 530 and communicatively coupled to NE 510B through path 532. In the example of FIGS. 5A-5B, paths 522, 530 may be designated initially as working paths and paths 524, 532 may be designated initially as protect paths. While each of clients 520A, 520B maintain separate path sets for their connections with portal 508A, portal 508A maintains a single IPL 526 for communication within portal 508A within domain 504.

Thus, IPL 526 may be shared or designated as an N:1 shared resource, wherein IPL 526 may be shared by the N clients of domain 504. In addition, accordingly the network protection link pairs of domain 504 external to portal 508A—such as the pair of paths 522, 524 or the pair of paths 530, 532—may be designated as 1:1 shared resources, wherein a given pair of paths is used by a single client of domain 504.

Resources associated with IPLs such as IPL 526, 528 may protect multiple working paths for link failures. For example, IPL 526 may be configured to transport messaging for protecting both working path 522 and working path 530. Such resources may include, for example, OTN tributary slots.

Entities within system 100 may communicate using protected switching and associated protected switching connections. Such connections may include those protected using, for example, the G.8031, G.873.1, G.8131.1, or G.8131.2 standards. Furthermore, such connections may include a working path and a protect path, as described above. One of such paths may be designated as active, wherein an element such as an NE monitors the paths for inbound traffic, will accept packets from the active path, and simply drop data packets from the other path, but yet still accept control packets required for the operation of a path protection protocol. In one embodiment, the working path may be initially configured as the active path. If the working path is down or otherwise unavailable, then the protect path may be configured as the active path. System 100 may be configured to determine whether various nodes or links of system 100 are down or inoperable, causing a reconfiguration of active paths, working paths, or protect paths. To affect such reconfiguration, each of NEs 510A, 510B, 510C, 510D may monitor respective protect paths for control and status messages, such as automatic protection switching ("APS") messages. APS messages may implement a control packet, include protocol messages, include property and state information of an originating switch, and may be exchanged using the protect path.

Each of NEs 510A, 510B, 510C, 510D may be configured to store pre-determined states of operation in memory. Such states may be stored in any suitable manner, such as in a table, record, or other data structure. Each such table may contain indications, for each state, of what actions should be taken given any number of conditions observed. NEs 510A, 510B, 510C, 510D may be configured to periodically exchange APS messages. Such messages may be exchanged one-for-one, and in both directions. Such APS messages may contain information pertaining to the status, state, and operation of a switch to be communicated to another switch. In addition, NEs 510A, 510B, 510C, 510D may be configured to periodically exchange "Keep-Alive Messages." Such a keep-alive message may be implemented in any suitable manner by which one entity sends a periodic or expected message to another entity to inform the other entity that the original entity is still functional and operating.

System 100 may utilize one-to-one protection. In such a case, user traffic may be transmitted on either of the protect path and working path. However, user traffic may not be transmitted on both the working path and protect path. If an entity attempts to transmit user traffic on working and another entity attempts to transmit user traffic on a corresponding protect path, neither entity will receive the other end's traffic, and the traffic may be lost.

Upon detection of a loss in user traffic, elements of system 100 such as NEs 510A, 510B, 510C, 510D and clients 520A, 520B, 520C may be configured to switch to a different predetermined state of operation based upon the conditions encountered. The conditions that are encountered, along with a current state of operation, may result in configurations specifying that the switch move user traffic to from working path to a protect path, or vice-versa. The result after such operations may constitute a new state of operation.

System 100 may be configured to use mesh-related messaging for internal communication between the nodes of a portal, while using linear-related messaging for external communication from the portal to a client. In one embodiment, system 100 may be configured to utilize any multiplexing protocol such that protection switching messages for the N clients may be transported on the same logical link of IPL 526. In another embodiment, system 100 may be configured to utilize shared mesh protection (SMP) APS messages for communication within a portal, such as over IPL 526. In yet another embodiment, system 100 may be configured to utilize the G.smp protocol for shared mesh protection. In various embodiments, system 100 may be configured to utilize linear APS messaging between a portal and external elements, such as between portal 508A and client 520A along paths 522, 524, 530, 532.

In order to handle internal communication using a shared mesh protection such as G.smp APS messaging in conjunction with external communication using linear APS messaging, an NE may be configured to translate, merge, or duplicate messages. For example, given an incoming linear APS message on path 524 and an incoming linear APS message on path 532, NE 510B may be configured to determine the G.smp APS equivalent(s) for the substance of both messages and deliver the message(s), if necessary, to NE 510A via IPL 526. Without such translation, multiple such linear APS messages from different sources (client 520A and 520B) may violate the linear APS protocol. In another example, given an incoming G.smp APS message on IPL 526 from NE 510A, NE 510B may be configured to determine the linear APS message equivalents and send each such message over path 524, 532, respectively. In one embodiment, such messages sent via path 524, 532 may be different, as each such message may include instructions for a specific one of client 520A or 520B. In another embodiment, such messages sent via path 524, 532 may be equivalent, as the message may be a broadcast message for both 520A and 520B to receive and handle. An NE or portal may use an interworking function to determine how to translate the messages. Such an interworking function may be implemented by mechanisms that, for example, access lookup tables, decisional logic, or other sources of information to determine the translation. The particular translation may depend upon the specific protocols used, the specific protection indicia included in the messages, and the specific actions that are to be taken by an entity in response to the given indicia.

Each of NE 510A and NE 510B may be configured to determine if the other one of NE 510A or NE 510B, or a link thereof, has failed. Furthermore, an NE of another portal, such as NE 510C or NE 510D, may be configured to determine if one of NE 510A or NE 510B, or a link thereof, has failed.

In the examples of FIGS. 6A, 6B, 6C, 7A, and 7B, described in greater detail below, NE 510B may be configured to determine whether NE 510A, or a link associated with NE 510A, has failed. If any such failure is determined, NE 510B, as well as other NEs such as NE 510C or NE 510D, may be configured to communicate to perform reconfiguration of network communication links.

As described above, during normal operation a working path may be established, for example, between client 520A and NE 510A and between client 520B and NE 510A. Furthermore, during normal operation a protect path may be established, for example, between client 520A and NE 510B and between client 520B and NE 510B. Paths 522, 530 may be initially designated as the working paths and paths 524, 532 may be initially designated as the protect paths. Other working and protect paths may be established within system 100.

Each working path and protect path may be independently monitored by a part of maintenance association end points (MEP). The designation of what portions of system 100 are implemented as MEPs may be determined according to the protocols or standards used by system 100. For example, when using OTN, MEPs may include Optical Data Unit k path (ODUkP) termination points. Such ODUkP termination points may include a high-order or low-order ODUk in a given segment using protect and working paths. In such an example, Trail Trace may be used to determine whether an element is functioning correctly in a keep-alive message. In another example, when using Ethernet, MEPs may include Service Operations, Administration, and Maintenance (SOAM) Connectivity Fault Management (CFM) MEPs. These SOAM CFM MEPs may utilize monitoring of Continuity Check Messages (CCM). In yet another example, when using MPLS-TP, MEPs may include specific CFM monitoring endpoints based upon, for example, SOAM CFM (according to the International Telecommunication Union (ITU) 8113.1 specification) or Internet Engineering Task Force (IETF)-defined Bidirectional Forwarding Detection (BFD) (according to the ITU 8113.2 specification). Such endpoints may utilize keep-alive monitoring.

Multiple SB sets 518, 519 are illustrated in FIGS. 5A and 5B for a given NE, such as 518A in NE 510A in FIGS. 5A and 519A in NE 510A in FIG. 5B. SBs 518 may be associated with management of communication links for client 520A, while SBs 519 may be associated management of communication links client 520B. While SBs 518, 519 are illustrated as being distinct, in various embodiments SBs 518, 519 may be implemented by the same switch, function, or other management device.

Each of SBs 518, 519 are illustrated with at least three connector points. SBs 518, 519 may in fact include more such connector points. Each connector point may be communicatively coupled to a node external to the respective SB. Given instructions, commands, or control by their respective NEs, each of SBs 518, 519 may be configured to selectively route input and output by connecting two of three connector points.

Figure 6A:
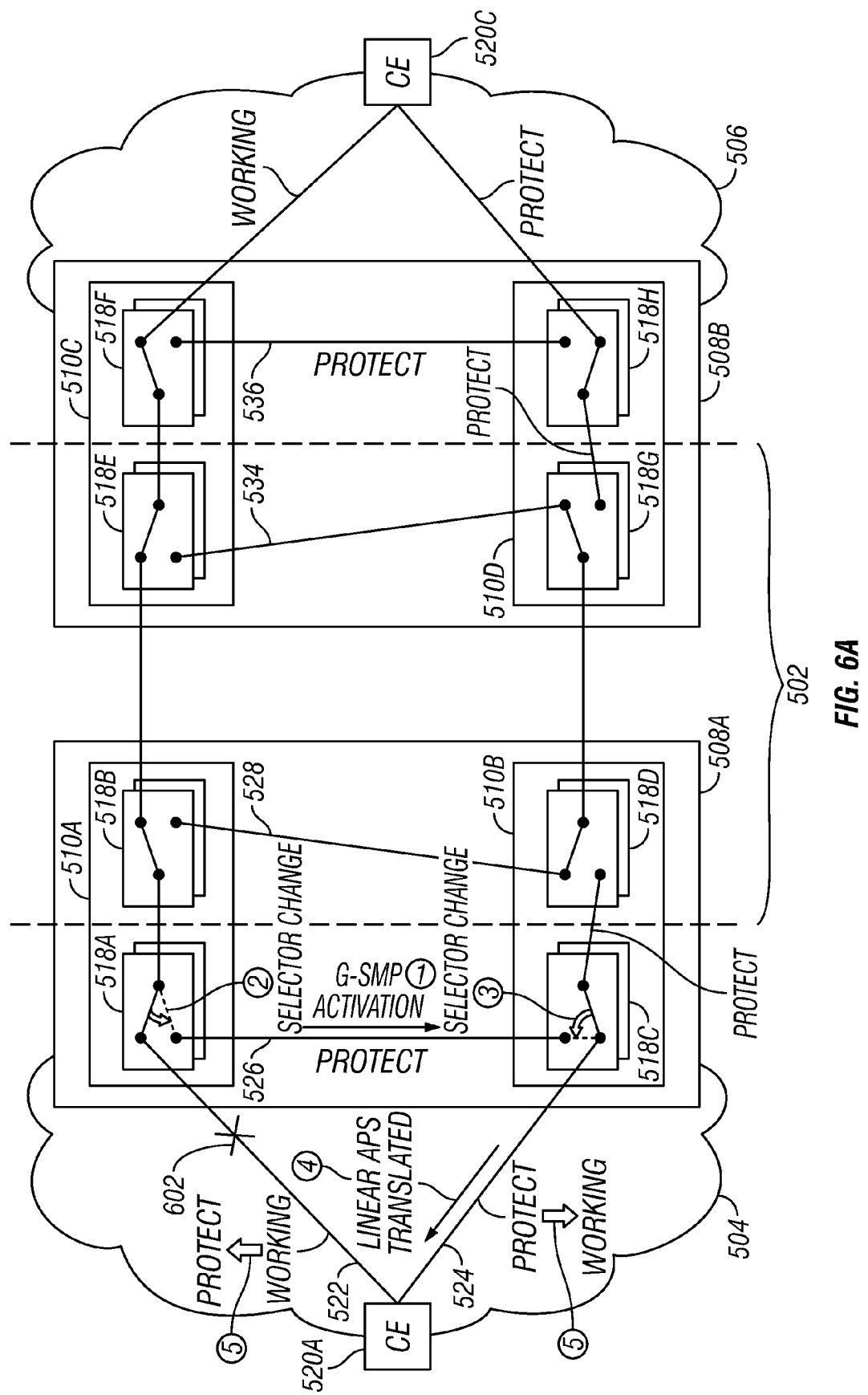
FIGS. 6A, 6B, and 6C illustrate example operation of a system to perform communication protection given a link failure.
Figure 6B:
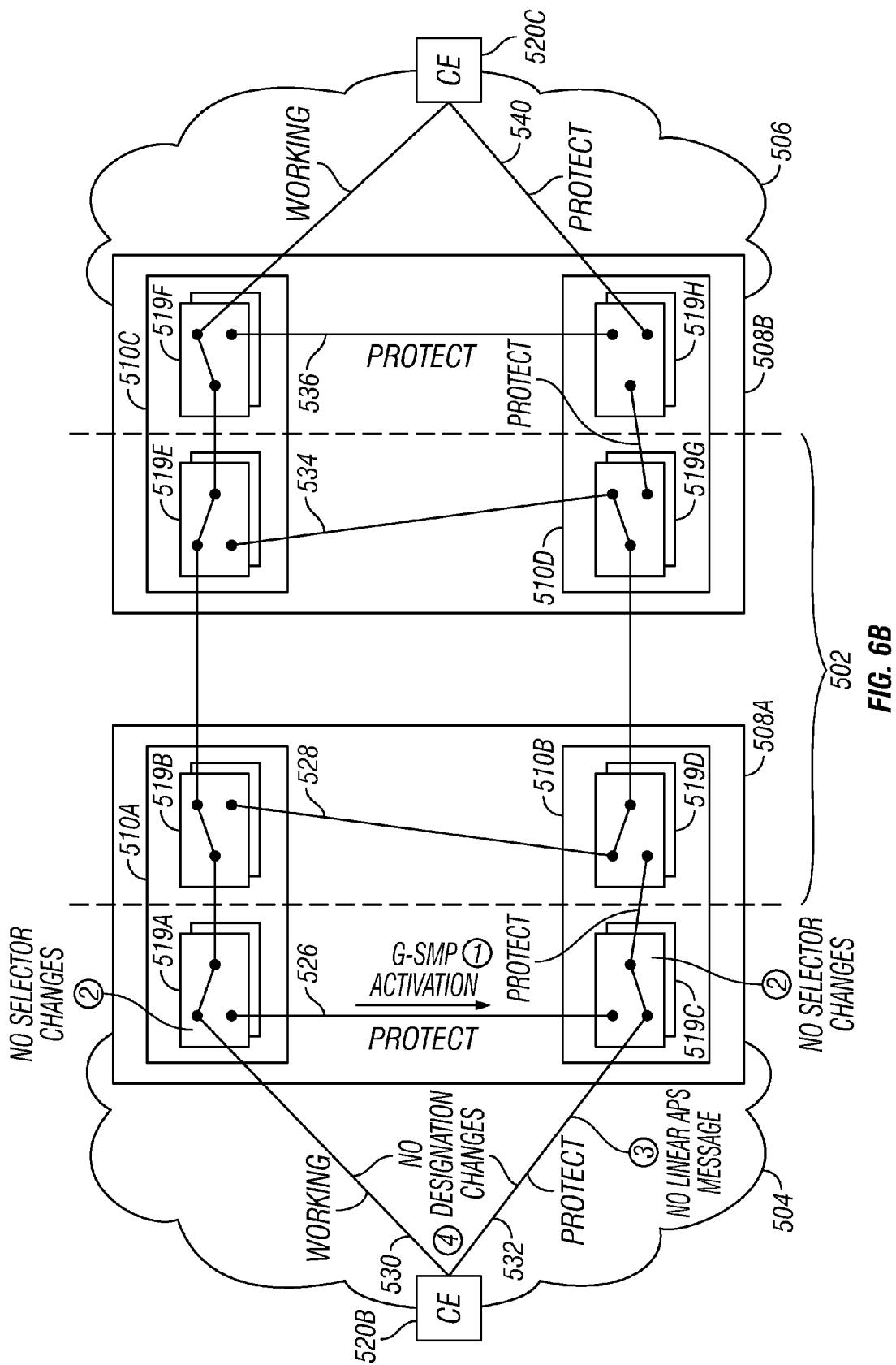
Figure 6C:
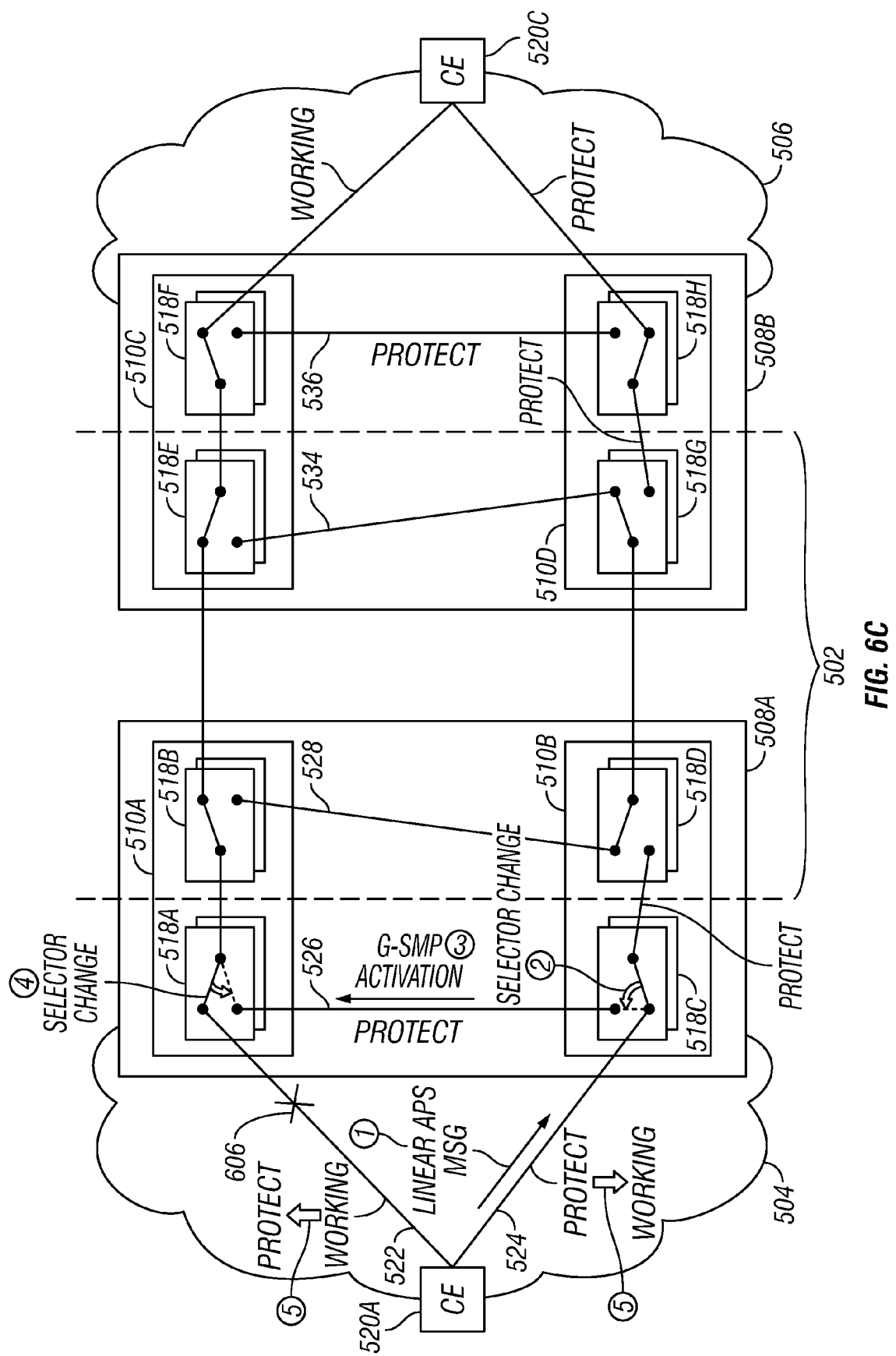

FIGS. 6A, 6B, and 6C illustrate example operation of system 100 to perform communication protection given a link failure. Such a failure 602 or a failure 606 may occur in a path such as path 522, the designated working path connecting client 520A and NE 510A. FIG. 6A illustrates that failure 602 unidirectionally breaks one of the paths between client 520A and NE 510A and is detected by NE 510a. FIG. 6B illustrates that failure 602 does not occur on the paths between client 520B and NE 510A, and as such is handled differently with respect to SBs 519 in comparison to SBs 518 in FIG. 6A. FIG. 6C illustrates that failure 606 unidirectionally breaks one of the paths between client 520A and NE 510A and is detected by client 520A.

In FIG. 6A, at (1) NE 510A may determine that an error has occurred with respect to path 522. The error may include failure 602. In one embodiment, failure 602 may be unidirectional, such that the error is detected by NE 510A but not client 520A. In another embodiment, failure 602 may be bidirectional, such that the error is detected by both NE 510A and client 520A. In such an embodiment, FIG. 6A may illustrate the response of NE 510A while FIG. 6C may illustrate the corresponding response of client 520A. Such a determination of failure 602 may be made by, for example, receipt of particular linear APS messages, determining signal loss, errors, or noise on the transmission media, or in any other suitable manner. In response, NE 510A may activate protection resources over IPL 526 by issuing a G.smp Activation message, or other mesh protection or 1:N protection message. The message may identify the failure with respect to 522.

At (2), SB 518A may cause a selector change such that the output to SB 518B is no longer connected to path 522, but is instead connected to IPL 526. At (3), NE 510B may receive the G.smp Activation message. If necessary, SB 518C may cause a selector change such that the output to path 524 is no longer connected to SB 518D but is instead connected to IPL 526. Such a selector change, as well as any other selector changes, is performed if necessary and presuming that such selector positions were not already established. The result may be that a logical path is now available from client 520A to the original intended destination. NE 510B may determine from an indicator in the G.smp Activation message to which client the activation message applies. For example, NE 510B may maintain or access a mapping of working path indices (to various clients) to G.smp activation indicators.

At (4), NE 510B translates the received G.smp Activation message into a linear APS Activation message and sends it to client 520A over path 524. At (5), path 522 may be designated as the protect path and path 524 may be designated as the working path. Such a designation may be performed by, for example, client 520A and NE 510A. Client 520A may further initiate a recovery for path 522.

In FIG. 6B, the failure 602 experienced on path 522 might not be experienced on path 530. Accordingly, portions of portal 508A not configured to handle errors for client 520A may not response. For example, at (1), NE 510A may issue the G.smp Activation message. The illustration of this message is a duplicate of the illustration at (1) in FIG. 6A; in total, NE 510A issues the G.smp Activation message once. The issuance at (1) of the G.smp Activation message is not made in response to any error or failure on path 530, but to failure 602 on path 522. Thus, in FIG. 6B, at (2) no selector changes are made, because the error was made with respect to paths for client 520A, and thus no changes might be needed at SBs 519 in association with protection of client 520B. Similarly, at (3) no linear APS message might be issued on path 532, and at (4) the original designations of working and protect paths are maintained.

In FIG. 6C, at (1) NE 510A may determine that an error has occurred with respect to path 522. The error may include failure 606. In one embodiment, failure 606 may be unidirectional, such that the error is detected by client 520A but not NE 510A. In another embodiment, failure 606 may be bidirectional, such that the error is detected by both NE 510A and client 520A. In such an embodiment, FIG. 6C may illustrate the response of NE 510A while FIG. 6A may illustrate the corresponding response of client 520A. Such a determination of failure 606 may be made by, for example, receipt of particular linear APS messages, determining signal loss, errors, or noise on the transmission media, or in any other suitable manner. In response, client 520A may activate protection resources with a linear APS message. The message may identify the failure with respect to 522.

At (2), NE 510B may determine the identification of the path through which the linear APS message was received. NE 510B may maintain or access a mapping of working path indices (to various clients) to G.smp activation indicators. Using the identification of the path through which the linear APS message was received, NE 510B may thus determine which SB to apply and what to include in a G.smp activation message. Thus, if necessary SB 518C may cause a selector change such that the input from client 520A is no longer connected through the output to SB 518D, but is instead connected to SB 518A. At (3), NE 510B may issue a G.smp Activation message, or other mesh protection or 1:N protection message, to NE 510A.

At (4), NE 510A may receive the G.smp Activation message and translate it. If necessary, SB 518A may cause a selector change such that the output to SB 518B is no longer connected to path 522 but is instead connected to IPL 526. Such a selector change, as well as any other selector changes, is performed if necessary and presuming that such selector positions were not already established. The result may be that a logical path is now available from client 520A to the original intended destination.

At (5), path 522 may be designated as the protect path and path 524 may be designated as the working path. Such a designation may be performed by, for example, client 520A and NE 510B. Client 520A may further initiate a recovery for path 522.

In some embodiments, failure 602 or failure 606 may include a bidirectional failure. In such embodiments, both NE 518A and CE 520A may initiate recovery processes. Such processes may include operations as detailed above in conjunction with FIGS. 6A and 6C, respectively. The recovery process initiated by NE 518A may include issuance of messages to NE 518B. Likewise, the recovery process initiated by CE 520A may include issuance of messages to NE 518B. In such embodiments, NE 518B may be configured to respond to the first of such messages that is received. Thus, if NE 518B receives a G.smp Activation message indicating failure from NE 518A before receiving a linear APS message indicating failure from client 520A, then NE 518B may operate as illustrated in FIG. 6A. Furthermore, if NE 518B receives a linear APS message indicating failure from client 520A before receiving a G.smp Activation message indicating failure, then NE 518B may operate as illustrated in FIG. 6C.

Figure 7A:
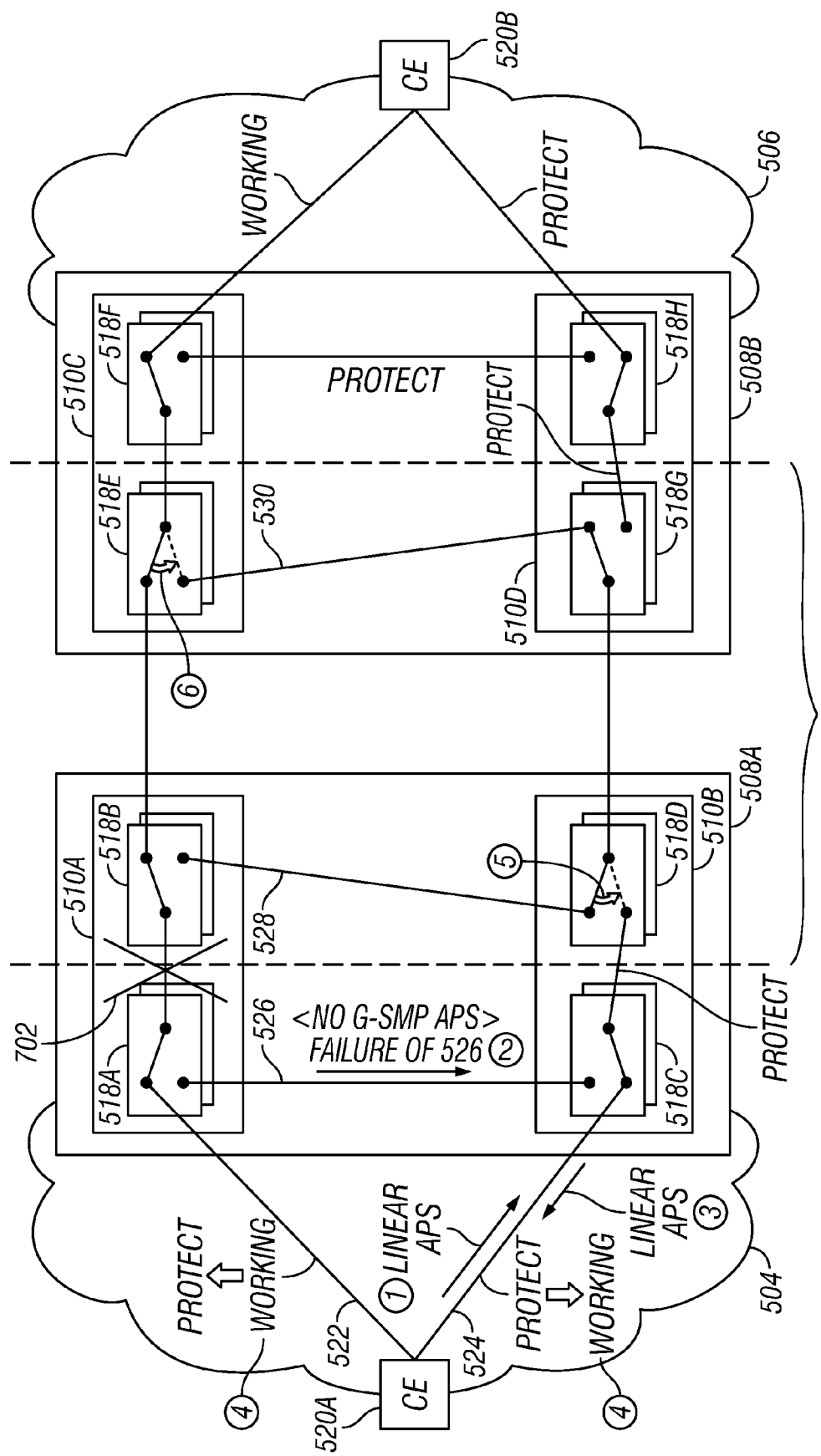
FIGS. 7A and 7B illustrate example operation of a system to perform communication protection given a node failure.
Figure 7B:
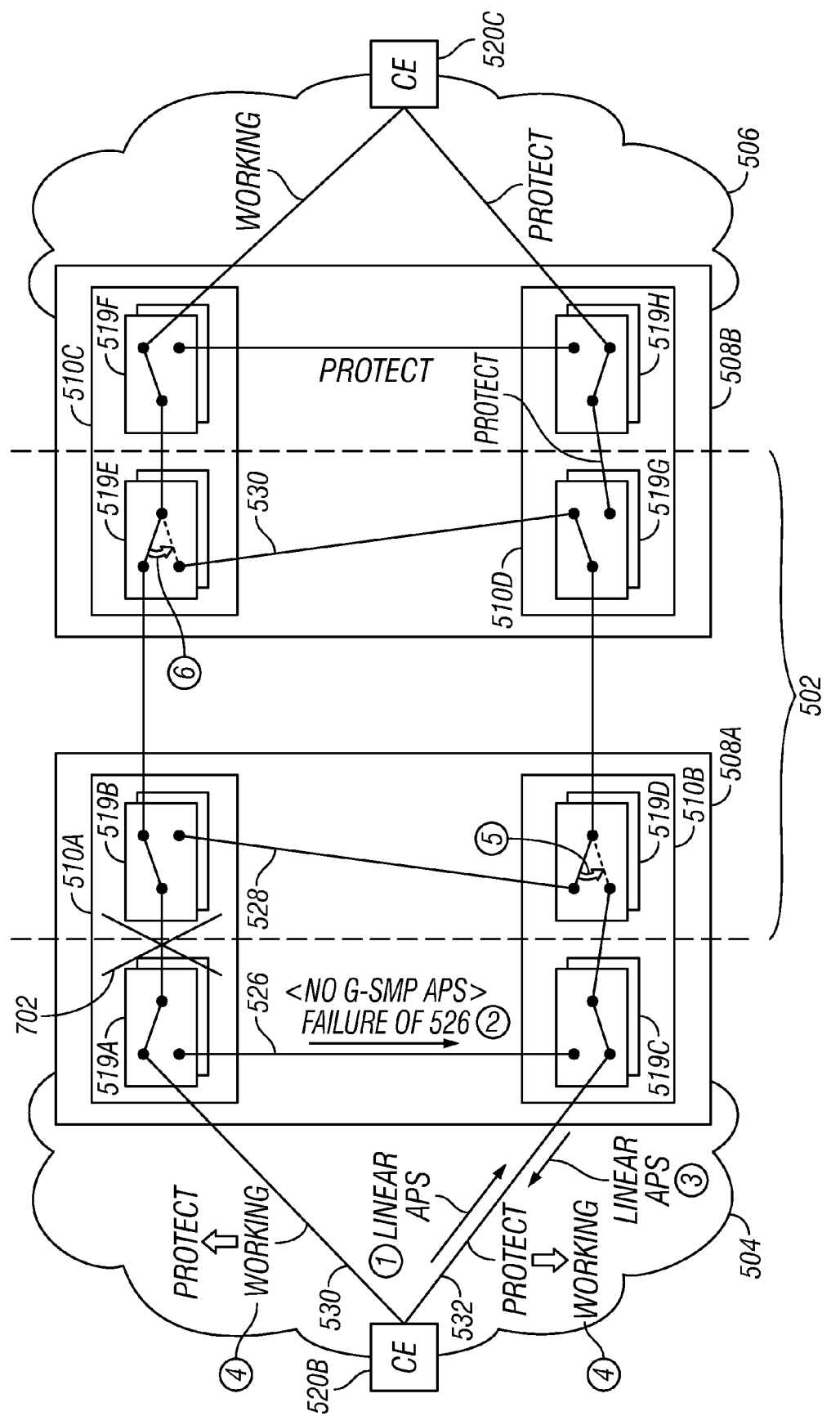

FIGS. 7A and 7B illustrate example operation of system 100 to perform communication protection given a node failure. Such a failure 702 may occur in a portal node such as NE 510A. Comparison of FIGS. 7A and 7B illustrate that such a failure 702 is seen with respect to the paths for both client 520A and client 520B.

In FIG. 7A, at (1) client 520A may determine that path 522 has failed. In response, client 520A may send a linear APS to NE 510B. The message may be received by NE 510B.

At the same time or nearly the same time, in FIG. 7B, at (1) client 520B may determine that path 530 has failed. In response, client 520B may send a linear APS to NE 510B. The message may be received by NE 510B.

In both FIGS. 7A and 7B, at (2), NE 510B may determine that an expected "keep-alive" or other similar message has not been received from NE 510A. In one embodiment, based upon the receipt of failure messages from client 520A and 520b, NE 510B may determine that NE 510A has failed. In another embodiment, based upon the receipt of failure messages from clients 520A and 520B and the failure of an expected message from NE 510A, NE 510B may determine that NE 510A has failed. Furthermore, NE 510B may determine that IPL 526 has failed. In yet another embodiment, NE 510B may determine that NE 510A has failed based upon a the receipt of failure messages from client 520A or client 520B, the determination that an expected message from 510A has not been received, and the determination that IPL 526 or 528 has failed. Such a determination may be made by triangulating the received information or lack thereof.

In FIG. 7A, at (3) NE 510B may issue a linear APS message to client 520A over path 524. The linear APS message may indicate that NE 510A has failed. At (4), path 522 may be designated as a protect path and path 524 may be designated as a working path. At (5), any necessary switch operations within SBs 518 may be performed, such as within 518D, such that the path from client 520A to its original destination may avoid NE 510A. Furthermore, at (6), NE 510C and NE 510D may determine that 510A has failed. Such a failure may be made, for example, through messages received from NE 510B or by a failure to receive expected messages from NE 510A. NE 510C and NE 510D may make appropriate switches so as to maintain the external path to the original destination from client 520A, such as by switching in SB 518E.

In FIG. 7B, at (3) NE 510B may issue a linear APS message to client 520B over path 532. The linear APS message may indicate that NE 510A has failed. At (4), path 530 may be designated as a protect path and path 532 may be designated as a working path. At (5), any necessary switch operations within SBs 519 may be performed, such as within 518D, such that the path from client 520B to its original destination may avoid NE 510A. Furthermore, at (6), NE 510C and NE 510D may determine that 510A has failed. Such a failure may be made, for example, through messages received from NE 510B or by a failure to receive expected messages from NE 510A. NE 510C and NE 510D may make appropriate switches so as to maintain the external path to the original destination from client 520B, such as by switching in SB 519E.

Furthermore, in embodiments of system 100 in which an additional E-NNI link exists between, for example, NE 510B and NE 510C—specifically, between SB 518D and SB 518E, or between SB 519D and SB 519E—recovery may be made through selector changes in respective SBs to facilitate connection of such an additional E-NNI link.

In a protection scheme known as "dedicated 1:1", a protection resource, such as an OTN tributary slot in a network element such as NE 110, or a portion of packet capacity on a link of interface 102, may be dedicated to protecting a single working path. In a protection scheme known as "shared 1:N", such a protection resource may protect any one of N different working paths. In shared 1:N protection, upon failure of a given one of the working paths, activation messages or other protection-related messages may be sent through the protection resource. The message may include a pre-provisioned protection connection identifier. Such an identifier may provide switching or ingress and egress port cross-connection information to nodes along the protection path. In a protection scheme known as "1+1", operations may be similar to a "1:1" protection scheme. However, in 1+1 a copy of a data signal may be transmitted on both a working and a protection path, while in 1:1 a copy of the data signal may be transmitted only on a working path until failure is detected, wherein a copy of the data signal will be transmitted on the protection path.

A mesh distributed linear 1+1 or 1:1 protection scheme may require multiple protection links per working connection. Thus, if system 100 were implemented with such a mesh distributed linear protection scheme, multiple protection links to portal 108 would be required for each client 120 in domain 104. A ring distributed linear 1+1 or 1:1 protection scheme may cause IPL links to become overloaded. Thus, if system 100 were implemented with such a ring distributed linear 1+1 or 1:1 protection scheme, IPL 126 might have to carry independent and separate protection links and working links at various times for each client 120 in domain 104. The result of working path failures, such as those caused by a node failure in portal 108, might thus overwhelm the capacity of IPL 126. The simultaneous transfer of working paths and protection paths may cause the overwhelming of IPL 126.

System 100 may combine both shared 1:N and dedicated 1:1 protection schemes as described above to provide hybrid distributed linear protection. System 100 may provide ring distributed protection for clients while employing 1:N shared protection. Specifically, for multiple clients 120 in domain 104, portal 108 may provide dedicated 1:1 protection (with a single protect path) between portal 108 and each such client, while employing 1:N shared protection on IPLs 126, 128. Use of ring distributed protection may remove problems associated with mesh distributed protection, such that only a single protect path is required between any given client 120 and portal 108. Furthermore, use of 1:N shared protection on IPLs 126, 128 may prevent each such IPL from overloading. Thus, a protection path for a given client 120 may include a concatenation of (a) a dedicated path between client 120 and portal 108; and (b) a portion of the resources of IPLs 126, 128. Such resources may include, for example, a set of OTN tributary slots on the respective IPL.

Figure 8:
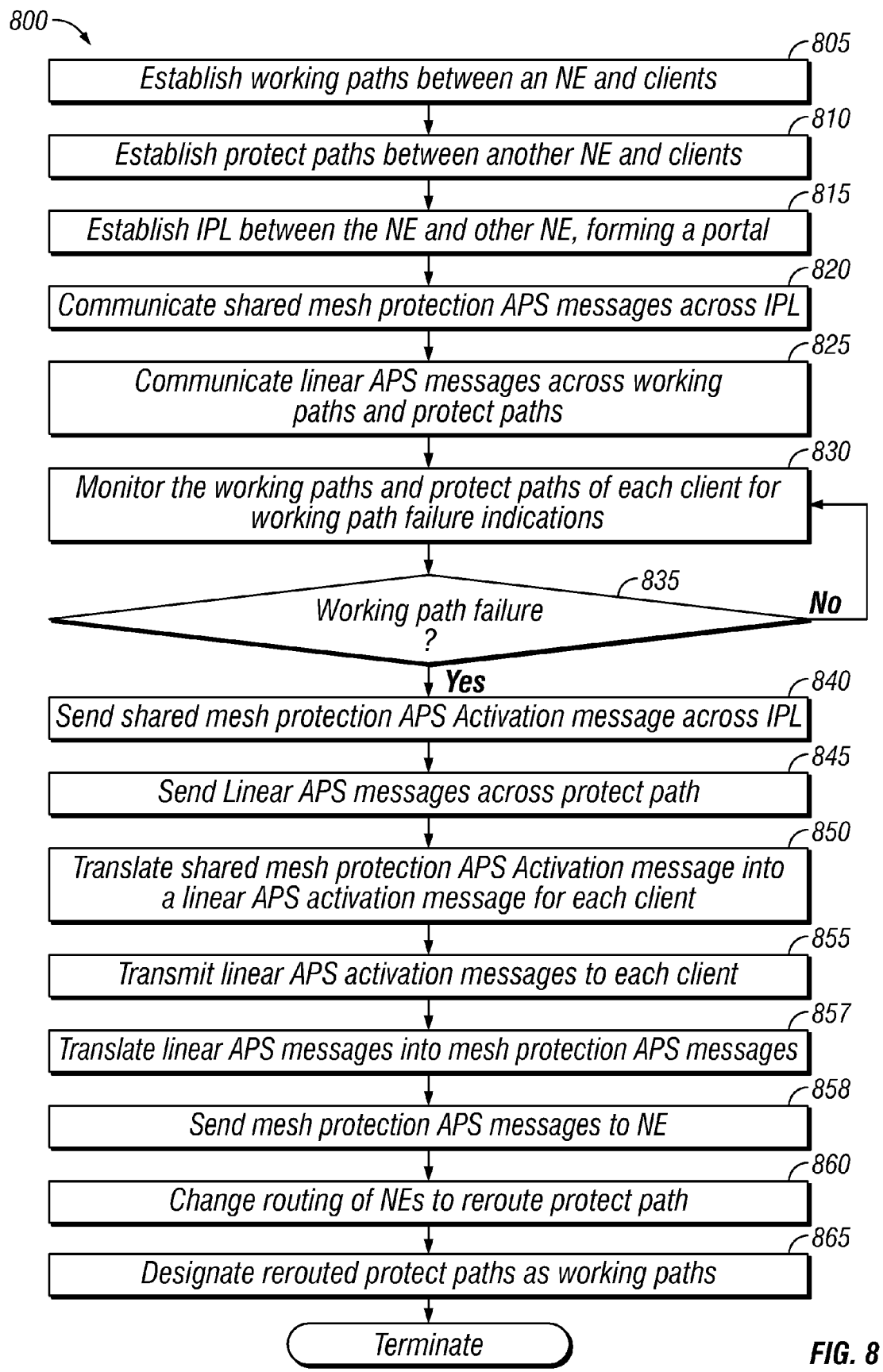
FIG. 8 illustrates an example embodiment of a method for link failure detection.

FIG. 8 illustrates an example embodiment of a method 800 for link failure detection. In 805, at a NE within a hybrid distributed linear protection system, working paths may be established between an NE and each of one or more clients. In 810, protect paths may be established between another NE and each of the one or more clients. The protect paths and working oaths may be established between the NE and the one or more clients in a domain communicatively coupled to the NE. In 815, an IPL may be established between the NE and the other NE. The NE and the other NE may form a portal of nodes by which the clients are provided linear protection. The network may utilize linear protection, such as Ethernet G.8031, OTN G.873.1, and MPLS-TP G.8131.1 and G.8131.2. Furthermore, the network may be configured according to N2U, N2E, or N2N models.

At 820, shared mesh protection APS messages may be communicated across the IPL. Such messages may multiplex information for each of the clients across the single IPL. At 825, linear APS messages may be communicated across the working paths and protect paths to each of the clients. Separate linear APS messages may be sent to each client regarding the respective client.

At 830, the working paths and protect paths of each client may be monitored for indications of working path failure. Such indications may include messages, loss of transmission media signal, transmission media noise, or other suitable indicators. In 835, it may be determined whether such indications of a working path failure have been received. Such a determination may be made for each client and its respective working path. If such messages have not been received, method 800 may return to 830.

If such messages have been received, the resultant operation may depend on whether the messages have been received indicating: a) a unidirectional error from the perspective of the NE; b) a unidirectional error from the perspective of a client; or c) a bidirectional error from the perspective of both the NE and the client. Method 800 is illustrated below as handling any one of such cases. Depending upon the detected error, one or more of the steps below may be omitted, as described in greater detail.

In 840, if an error has been detected from the perspective of the NE, a shared mesh protection APS message indicating activation of one or more protect paths associated with the affected working path or paths may be sent across the IPL. Such a message may encompass the determination of each of the multiple working paths. If no error has been detected from the perspective of the NE as described in 835, then 840 might not be performed.

At 845, if an error has been detected from the perspective of the client, a linear APS message indicating activation of one or more protect paths or segments associated with the affected working path or paths may be sent across a protect path to the other NE. Such a message, by virtue of being sent on a particular protect path between the client and the portal, may identify the failed working path. If no error has been detected from the perspective of the client as described in 835, then 845 might not be performed. At 850, if an error has been detected from the perspective of the NE, and if a resultant shared mesh protection APS message is received before any linear APS messages indicating error are received from the client, the shared mesh protection APS message for protect activation may be translated into linear APS messaging. Such a translation may include creating a linear APS message for each of the affected clients, which may be determined by mapping indicators in the shared mesh protection APS message to various linear paths to the various clients. The created linear APS message may indicate that the protect path is to be activated and become the working path, or at least transmit traffic. At 855, the translated APS messages may be sent on each respective path to the respective client associated with an affected working path. If an error has not been detected from the perspective of the NE, then 850 and 855 might not be performed. Furthermore, if an indication of an error on the same working path is received from the client before such indicators are received from the NE, then 850 and 855 might not be performed.

At 857, if an error has been detected from the perspective of the client and if a resultant APS messages are received before any shared mesh protection APS message indicating error is received from the NE, the linear APS message may be translated into mesh protection APS messages. Such a translation may include determining the path on which the linear APS message arrived and, based on such a path, determining by a reference mapping what indicators to include in the shared mesh protection APS message. At 858, the translated mesh protection APS messages may be sent on an IPL to the NE. If an error has not been detected from the perspective of the client, then 857 and 858 might not be performed. Furthermore, if an indication of an error on the same working path is received from the NE before such indicators are received from the client, then 857 and 858 might not be performed.

At 860, the routing of the NEs, if necessary, as well as any other elements of the system may be changed such that the respective protect paths or segments associated with any affected working paths are rerouted to maintain an end-to-end connection. Routing of protect paths or segments that are not associated with affected working paths may be maintained.

At 865, the rerouted protect paths or segments may be designated as working paths or segments, or otherwise enabled to transmit traffic to destinations from the clients. Method 800 may terminate.

Figure 9:
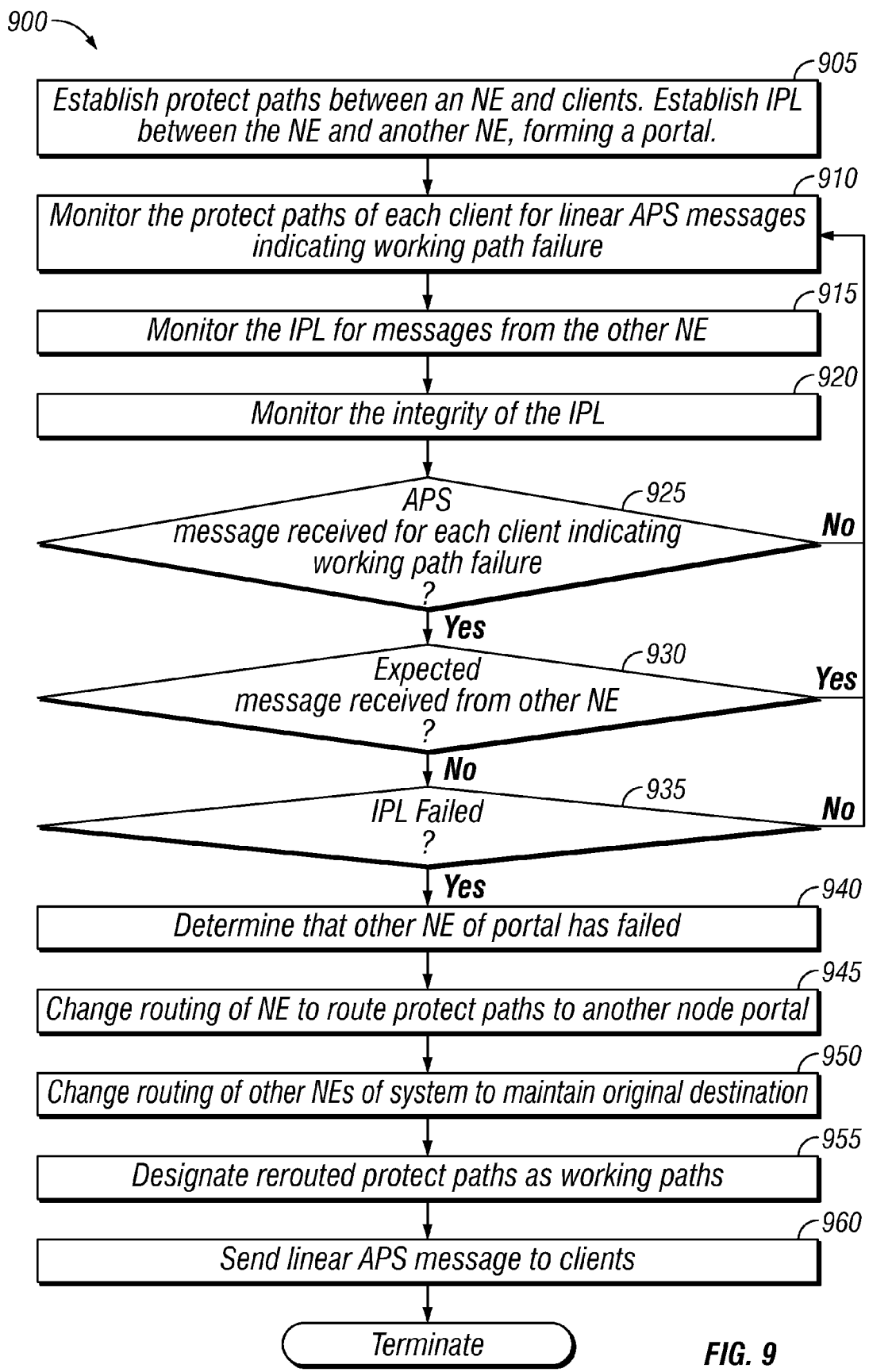
FIG. 9 illustrates an example embodiment of a method for node failure detection.

FIG. 9 illustrates an example embodiment of a method 900 for node failure detection. In 905, at a NE within a hybrid distributed linear protection system, protect paths and an IPL may be established. The protect path may be established between the NE and one or more clients in a domain communicatively coupled to the NE. The IPL may be established with another NE. The NE and the other NE may form a portal of nodes by which the client is provided linear protection. The network may utilize linear protection, such as Ethernet G.8031, OTN G.873.1, and MPLS-TP G.8131.1 and G.8131.2. Furthermore, the network may be configured according to N2U, N2E, or N2N models.

At 910, the protect paths may be monitored for linear APS messages indicating a working path failure from the client. At 915, the IPL may be monitored for messages from the other NE of the portal. Such messages may be expected to be received if the NE is operating normally and may include, for example, shared mesh protection APS messages or keep-alive messages. At 920, the IPL may be monitored for the integrity of the IPL itself.

At 925, it may be determined whether an APS message indicating a working path failure from the client has been received. Such a determination may be made for each of the clients. If not, method 900 may return to 910. If so, at 930, it may be determined whether any messages have been received from the other NE of the portal. Such messages may be expected to be received if the other NE of the portal is operating properly. The messages may include, for example, shared mesh protection APS or keep-alive messages. If any messages have been received, method 900 may return to 910 or take corrective action with regards to the working path failure. If such messages have not been received, at 935 it may be determined whether the IPL path is active. If so, method 900 may return to 910 or take corrective action with regards to the working path failure or missing APS or keep-alive messages. If so, at 940 it may be determined that the other NE of the portal has failed. Any suitable corrective action may be taken.

For example, at 945, routing configuration of the NE may be changed so as to route each of the protect paths to another node portal. Such routing may, for example, shift the protect paths from away from IPL connecting the NE and the failed NE. At 950, other NEs of the system may adjust routing so as to accept the newly rerouted protect path and route it to the original intended destination. Such other NEs may include, for example, NEs of the other node portal. At 955, the rerouted protect paths may be designated as the working paths. At 960, an APS message may be sent to the client informing the client about the determined failure or the rerouting. The method may terminate.

The steps of methods 800 and 900 may be conducted in parallel by different entities implementing methods 800 and 900. Furthermore, methods 800 and 900 may be conducted in parallel with other methods for providing switching protection. Although FIGS. 8 and 9 disclose a particular number of steps to be taken with respect to example methods 800 and 900, methods 800 and 900 may be executed with more or fewer steps than those depicted in FIGS. 8 and 9. In addition, although FIGS. 8 and 9 disclose a certain order of steps to be taken with respect to methods 800 and 900, the steps comprising methods 800 and 900 may be completed in any suitable order. Methods 800 and 900 may be implemented using the system of FIG. 1-7 or any other system, network, or device operable to implement methods 800 and 900. In certain embodiments, methods 800 and 900 may be implemented partially or fully in software embodied in computer-readable media.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, and other electromagnetic and/or optical carriers; and/or any combination of the foregoing.

Although the present disclosure has been described in detail, it should be understood that various changes, substitutions, and alterations can be made hereto without departing from the spirit and the scope of the disclosure as defined by the appended claims

What is claimed is:

1. A multi-node distributed protection method comprising:
providing, at a first node portal located at the edge of an administrative network domain including one or more clients, dedicated 1:1 protection switching to each of the clients in the administrative network domain; and
performing, at the first node portal, 1:N protection switching for each of the clients on an intraportal link communicatively coupling a first network element and a second network element located within the first node portal.

2. The method of claim 1, wherein:
providing dedicated 1:1 protection switching to each of the clients in the administrative network domain includes exchanging linear automatic protection switching ("APS") messages with the clients in the administrative network domain over a path pair to each client, each path pair including:
a working path segment communicatively coupling a respective client and the first network element; and
a network protect path segment communicatively coupling the respective client and the second network element; and
performing 1:N protection switching for each of the clients on the intraportal link includes:
translating the linear APS messages received on the network protect path segment into a shared mesh protection message, the shared mesh protection message configured to activate an intraportal protection path segment on the intraportal link, the intraportal protection path segment configured to protect a plurality of working paths; and
exchanging the shared mesh protection message between the first network element and the second network element over the intraportal link.

3. The method of claim 2, further comprising:
determining a failed working path segment;
sending the shared mesh protection activation message to the second network element; and
based on the shared mesh protection activation message, connecting an associated network protect path segment to the intraportal protection path segment;
wherein the failed working path segment and the associated network protect path segment are included in a path pair of one of the clients.

4. The method of claim 3, further comprising:
translating the shared mesh protection activation message into one or more linear APS activation messages; and
sending the linear APS activation message to a respective one or more of the clients over a corresponding respective one or more of the network protect path segments.

5. The method of claim 4, further comprising, based on the linear APS activation message, activating a network protect path segment associated with the linear APS activation message.

6. The method of claim 2, further comprising:
determining a failed working path segment;
receiving an activation linear APS message from a client at the second network element; and
based on which of the activation linear APS message, connecting an associated network protect path segment to the intraportal protection path segment;
wherein the client is communicatively coupled to the first network element through the failed working path segment.

7. The method of claim 2, further comprising:
determining a failed working path segment;
receiving an activation linear APS message from a client at the second network element;
sending the shared mesh protection activation message to the second network element; and,
based on which of the activation linear APS message and the shared mesh protection activation message was received first at the second network element, connecting an associated network protect path segment to the intraportal protection path segment;
wherein the client is communicatively coupled to the first network element through the failed working path segment.

8. The method of claim 2, further comprising:
determining receipt of a linear APS message indicating a failure of one of the working path segments;
monitoring the intraportal link for a status message from the second network element;
determining that the status message from the second network element has not been received;
monitoring integrity of the intraportal link;
determining that the intraportal link has failed; and
determining that the second network element has failed based upon determining that that the APS message has been received, that the status message from the second network element has not been received, and that the intraportal link has failed.

9. The method of claim 6, further comprising transmitting data between the client and a node within a second node portal communicatively coupled to the first node portal and located across a second administrative network domain, the transmitted data bypassing the second network element.

10. The method of claim 1, wherein the first node portal is configured to communicate using G.8031 Ethernet Linear Protection, G.873.1 Optical Transport Network Linear Protection, or Multiprotocol Label Switching Transport Profile Linear Protection G.8131.1 and G.8131.2 standards.

11. The method of claim 1, wherein the first node portal is configured to provide protection in conjunction with a single-homed or dual-homed user network interface (UNI).

12. The method of claim 1, wherein the first node portal is configured to provide protection as part of a Network-to-UNI model, Network-to-Ethernet-Network-Interface model, or Network-to-Network model.

13. A non-transitory computer readable medium that stores computer-executable instructions which, when executed by a processor, performs a multi-node distributed protection method, the method comprising:
providing, at a first node portal located at the edge of an administrative network domain including one or more clients, dedicated 1:1 protection switching to each of the clients in the administrative network domain; and performing, at the first node portal, 1:N protection switching for each of the clients on an intraportal link communicatively coupling a first network element and a second network element located within the first node portal.

14. The article non-transitory computer readable medium of claim 13, wherein:
providing dedicated 1:1 protection switching to each of the clients in the administrative network domain includes exchanging linear automatic protection switching ("APS") messages with the clients in the administrative network domain over a path pair to each client, each path pair including:
a working path segment communicatively coupling a respective client and the first network element; and
a network protect path segment communicatively coupling the respective client and the second network element; and
performing 1:N protection switching for each of the clients on the intraportal link includes:
translating the linear APS messages received on the network protect path segment into a shared mesh protection message, the shared mesh protection message configured to activate an intraportal protection path segment on the intraportal link, the intraportal protection path segment configured to protect a plurality of working paths; and
exchanging the shared mesh protection message between the first network element and the second network element over the intraportal link.

15. The non-transitory computer readable medium of claim 14, further comprising instructions for causing the processor to:
determine a failed working path segment;
send the shared mesh protection activation message to the second network element; and
based on the shared mesh protection activation message, connect an associated network protect path segment to the intraportal protection path segment; wherein
the failed working path segment and the associated network protect path segment are included in a path pair of one of the clients.

16. The non-transitory computer readable medium of claim 15, further comprising instructions for causing the processor to:
translate the shared mesh protection activation message into one or more linear APS activation messages; and
send the linear APS activation messages to a respective one or more of the clients over a corresponding respective one or more of the network protect path segments.

17. The non-transitory computer readable medium of claim 16, further comprising instructions for causing the processor to, based on the linear APS activation messages, activate a network protect path segment associated with the linear APS activation message.

18. The non-transitory computer readable medium of claim 14, further comprising instructions for causing the processor to:
determine a failed working path segment;
receive an activation linear APS message from a client at the second network element; and
based on which of the activation linear APS message, connect an associated network protect path segment to the intraportal protection path segment;
wherein the client is communicatively coupled to the first network element through the failed working path segment.

19. The non-transitory computer readable medium of claim 14, further comprising instructions for causing the processor to:
determine a failed working path segment;
receive an activation linear APS message from a client at the second network element;
send the shared mesh protection activation message to the second network element; and,
based on which of the activation linear APS message and the shared mesh protection activation message was received first at the second network element, connect an associated network protect path segment to the intraportal protection path segment;
wherein the client is communicatively coupled to the first network element through the failed working path segment.

20. The non-transitory computer readable medium of claim 14, further comprising instructions for causing the processor to:
determine receipt of a linear APS message indicating a failure of one of the working path segments;
monitor the intraportal link for a status message from the second network element;
determine that the status message from the second network element has not been received;
monitor integrity of the intraportal link;
determine that the intraportal link has failed; and
determine that the second network element has failed based upon determining that that the APS message has been received, that the status message from the second network element has not been received, and that the intraportal link has failed.

21. The non-transitory computer readable medium of claim 20, further comprising instructions for causing the processor to transmit data between the client and a node within a second node portal communicatively coupled to the first node portal and located across a second administrative network domain, the transmitted data bypassing the second network element.

22. The non-transitory computer readable medium of claim 13, wherein the first node portal is configured to communicate using G.8031 Ethernet Linear Protection, G.873.1 Optical Transport Network Linear Protection, or Multiprotocol Label Switching Transport Profile Linear Protection G.8131.1 and G.8131.2 standards.

23. The non-transitory computer readable medium of claim 13, wherein the first node portal is configured to provide protection in conjunction with a single-homed or dual-homed user network interface (UNI).

24. The non-transitory computer readable medium of claim 13, wherein the first node portal is configured to provide protection as part of a Network-to-UNI model, Network-to-Ethernet-Network-Interface model, or Network-to-Network model.

25. A first node portal located at the edge of an administrative network domain including one or more clients, the first node portal comprising:
a first network element;
a second network element;
a path pair to each client providing dedicated 1:1 protection switching to each of the clients in the administrative network domain by exchanging linear automatic protection switching ("APS") messages with the clients in the administrative network domain, each path pair including a working path segment communicatively coupling a respective client and the first network element and a network protect path segment communicatively coupling the respective client and the second network element; and
an intraportal link communicatively coupling the first network element and the second network element, the intraportal link performing 1:N protection switching for each of the clients on the intraportal link by transmitting a shared mesh protection message translated from the linear APS messages received on the network protect path, the shared mesh protection message configured to activate an intraportal protection path segment on the intraportal link, the intraportal protection path segment configured to protect a plurality of working paths, and exchanging the shared mesh protection message between the first network element and the second network element over the intraportal link.

26. The first node portal of claim 25, wherein
the first network element determines a failed working path segment and sends, via the intraportal link, the shared mesh protection activation message to the second network element; and
the second network element connects, based on the shared mesh protection activation message, an associated network protect path segment to the intraportal protection path segment;
wherein the failed working path segment and the associated network protect path segment are included in a path pair of one of the clients.

27. The first node portal of claim 26, wherein
the second network element translates the shared mesh protection activation message into one or more linear APS activation messages and sends the linear APS activation messages to a respective one or more of the clients over a corresponding respective one or more of the network protect path segments.

28. The first node portal of claim 27, wherein a particular network protect path segment is associated with a particular linear APS activation message.

29. The first node portal of claim 25, wherein
the second network element determines a failed working path segment;
the second network element receives an activation linear APS message from a client; and
based on which of the activation linear APS message, connect an associated network protect path segment to the intraportal protection path segment;
wherein the client is communicatively coupled to the first network element through the failed working path segment.

30. The first node portal of claim 25, wherein
the first network element and the second network element determine a failed working path segment;
the second network element receives an activation linear APS message from a client at the second network element;
the first network element sends the shared mesh protection activation message to the second network element; and,
based on which of the activation linear APS message and the shared mesh protection activation message was received first at the second network element, connect an associated network protect path segment to the intraportal protection path segment;
wherein the client is communicatively coupled to the first network element through the failed working path segment.

31. The first node portal of claim 25, wherein
the first network element receives a linear APS message indicating a failure of one of the working path segments;
the first network element monitors the intraportal link for a status message from the second network element;
the first network element determines that the status message from the second network element has not been received;
the first network element monitors integrity of the intraportal link;
the first network element determines that the intraportal link has failed; and
the first network element determines that the second network element has failed based upon determining that that the APS message has been received, that the status message from the second network element has not been received, and that the intraportal link has failed.

32. The first node portal of claim 31, wherein the first node portal transmits data between the client and a second node portal communicatively coupled to the first node portal and located across a second administrative network domain, the transmitted data bypassing the second network element.

33. The first node portal of claim 25, wherein the first node portal communicates using G.8031 Ethernet Linear Protection, G.873.1 Optical Transport Network Linear Protection, or Multiprotocol Label Switching Transport Profile Linear Protection G.8131.1 and G.8131.2 standards.

34. The first node portal of claim 25, wherein the first node portal provides protection in conjunction with a single-homed or dual-homed user network interface (UNI).

35. The first node portal of claim 25, wherein the first node portal provides protection as part of a Network-to-UNI model, Network-to-Ethernet-Network-Interface model, or Network-to-Network model.

\* \* \* \* \*